(12) United States Patent  (10) Patent No.: US 8,006,946 B2
Bonnema  (45) Date of Patent: Aug. 30, 2011

(54) BIRD FEEDER

(75) Inventor: James Vincent Bonnema, Middleton, MA (US)

(73) Assignee: Droll Yankees, Inc., Foster, RI (US)

( * ) Notice: Subject to any disclaimer, the term of this patent is extended or adjusted under 35 U.S.C. 154(b) by 179 days.

(21) Appl. No.: 12/188,578

(22) Filed: Aug. 8, 2008

(65) Prior Publication Data

US 2008/0290243 A1   Nov. 27, 2008

Related U.S. Application Data

(62) Division of application No. 11/295,917, filed on Dec. 7, 2005.

(51) Int. Cl.
*A45F 3/44* (2006.01)

(52) U.S. Cl. ............ 248/156; 248/688; 248/125.8; 248/125.1; 248/125.7; 248/132; 248/158; 248/161; 248/166; 248/157; 248/188; 248/440.1; 248/163.1; 248/177.1; 248/188.8; 248/188.2; 248/188.5

(58) Field of Classification Search .......... 248/49, 248/688, 125.8, 125.1, 132, 156, 158, 161, 248/166, 125.7, 157, 188, 440.1, 163.1, 177.1, 248/188.8, 188.2, 188.5
See application file for complete search history.

(56) References Cited

U.S. PATENT DOCUMENTS

| | | | |
|---|---|---|---|
| 1,910,505 A * | 5/1933 | Shaw | 108/28 |
| 2,524,502 A | 10/1950 | Wilkinson | |
| 2,912,202 A * | 11/1959 | Petrick | 248/412 |
| 3,115,865 A | 12/1963 | Parkes et al. | |
| 3,173,642 A * | 3/1965 | Greenspan | 248/170 |
| 3,185,422 A * | 5/1965 | Spindler | 248/125.1 |
| 3,244,150 A | 4/1966 | Blair | |
| 3,301,217 A | 1/1967 | Prowinsky | |
| 3,316,883 A | 5/1967 | Johnson | |
| 3,399,650 A | 9/1968 | Goodman | |
| 3,568,641 A | 3/1971 | Kilham | |
| 3,586,852 A * | 6/1971 | Bradley | 362/280 |
| D231,369 S | 4/1974 | Kilham | |
| 3,804,355 A * | 4/1974 | Uroshevich | 248/124.1 |
| D234,569 S | 3/1975 | Kilham | |

(Continued)

OTHER PUBLICATIONS

"Lawn Anchor" brochure, Design Life Products, Inc., Highland Park, IL 60035 (2 pgs).

*Primary Examiner* — Nkeisha Smith
(74) *Attorney, Agent, or Firm* — Salter & Michaelson

(57) ABSTRACT

A bird feeder that includes a bird feed holder having open top and bottom ends, a plurality of feeding ports disposed in a sidewall defining the holder, a plurality of perches each associated with an inlet of an associated feeding port and a removable base for engaging with the bottom end of the holder, the removable base having a closed position for sealing the bottom end of the holder so as to retain the bird feed therein and an open position in which the base is removed from the holder to enable access to the bottom end of the holder. One embodiment has a manually operated latch member supported by the base and supported for radial engagement so as to enable releasable securing of the removable base to the holder. In another embodiment a manually operated latch couples to a main body portion, the latch being supported for rotation with respect to the main body portion to releasably secure the base assembly to the housing. Also disclosed is a feeder support apparatus.

4 Claims, 30 Drawing Sheets

U.S. PATENT DOCUMENTS

| | | | |
|---|---|---|---|
| D234,615 S | 3/1975 | Kilham | |
| D236,139 S | 7/1975 | Kilham | |
| 3,913,527 A | 10/1975 | Kilham | |
| D239,182 S | 3/1976 | Kilham | |
| 3,961,176 A * | 6/1976 | Gleason | 362/413 |
| D241,149 S | 8/1976 | Miller | |
| D244,098 S | 4/1977 | Kilham | |
| 4,030,451 A | 6/1977 | Miller | |
| 4,102,308 A | 7/1978 | Kilham | |
| D252,288 S | 7/1979 | Kilham | |
| D262,917 S | 2/1982 | Kilham | |
| 4,327,669 A | 5/1982 | Blasbalg | |
| 4,328,765 A | 5/1982 | Kilham | |
| D264,990 S | 6/1982 | Kilham | |
| D265,921 S | 8/1982 | Kilham | |
| D265,938 S | 8/1982 | Kilham | |
| D265,939 S | 8/1982 | Kilham | |
| 4,355,597 A | 10/1982 | Blasbalg | |
| 4,361,116 A | 11/1982 | Kilham | |
| D269,113 S | 5/1983 | Kilham | |
| 4,434,745 A | 3/1984 | Perkins et al. | |
| 4,498,423 A | 2/1985 | Gainsboro et al. | |
| 4,712,512 A | 12/1987 | Schreib et al. | |
| 4,807,837 A * | 2/1989 | Gawlik et al. | 248/125.8 |
| 4,829,934 A | 5/1989 | Blasbalg | |
| 4,832,304 A * | 5/1989 | Morgulis | 248/533 |
| 4,920,897 A * | 5/1990 | Reed et al. | 108/150 |
| 4,977,859 A | 12/1990 | Kilham | |
| 5,016,573 A | 5/1991 | Power | |
| D320,290 S | 9/1991 | Kilham | |
| 5,046,699 A * | 9/1991 | Perreault et al. | 248/533 |
| 5,062,388 A | 11/1991 | Kilham | |
| 5,111,772 A | 5/1992 | Lipton | |
| 5,179,907 A * | 1/1993 | Galbraith | 116/209 |
| 5,207,180 A | 5/1993 | Graham | |
| 5,215,039 A | 6/1993 | Bescherer | |
| D337,244 S | 7/1993 | Kilham | |
| 5,293,889 A * | 3/1994 | Hall et al. | 135/16 |
| 5,320,227 A * | 6/1994 | Minoura | 211/22 |
| 5,323,735 A | 6/1994 | Meng | |
| 5,339,847 A * | 8/1994 | Kanter et al. | 135/16 |
| D352,138 S | 11/1994 | Tucker et al. | |
| 5,377,617 A | 1/1995 | Harwich | |
| 5,406,908 A | 4/1995 | Burleigh | |
| 5,452,682 A | 9/1995 | Bescherer et al. | |
| 5,463,979 A | 11/1995 | Fasino | |
| 5,465,683 A | 11/1995 | Reisdorf | |
| 5,482,246 A | 1/1996 | Derkoski | |
| 5,558,040 A | 9/1996 | Colwell et al. | |
| D385,067 S | 10/1997 | Whittles | |
| 5,699,753 A | 12/1997 | Aldridge, III | |
| 5,701,841 A | 12/1997 | Fasino | |
| 5,701,842 A | 12/1997 | Whittles | |
| 5,732,659 A | 3/1998 | Wiggins | |
| 5,791,286 A | 8/1998 | Taussig et al. | |
| 5,823,541 A | 10/1998 | Dietle et al. | |
| 5,829,382 A | 11/1998 | Garrison | |
| 5,876,011 A * | 3/1999 | Blasing | 248/411 |
| 6,007,032 A * | 12/1999 | Kuo | 248/185.1 |
| D422,755 S | 4/2000 | Colwell | |
| 6,056,250 A * | 5/2000 | Hillstrom et al. | 248/127 |
| 6,068,224 A * | 5/2000 | Horiuchi | 248/187.1 |
| D440,361 S | 4/2001 | Colwell | |
| D448,126 S | 9/2001 | Colwell | |
| D452,048 S | 12/2001 | Colwell | |
| 6,401,656 B1 | 6/2002 | Adkisson | |
| 6,412,737 B1 * | 7/2002 | Minagawa | 248/166 |
| 6,499,430 B2 | 12/2002 | Garcia-Lucio et al. | |
| 6,536,720 B1 * | 3/2003 | Yu | 248/125.7 |
| 6,539,892 B1 | 4/2003 | Bescherer | |
| 6,543,383 B1 | 4/2003 | Cote | |
| 6,598,839 B2 * | 7/2003 | Loughman | 248/125.7 |
| 6,612,320 B2 * | 9/2003 | Lin et al. | 135/33.41 |
| 6,647,921 B2 | 11/2003 | Stokes et al. | |
| 6,679,388 B1 * | 1/2004 | Chiu | 211/22 |
| 6,695,268 B1 * | 2/2004 | Hsieh | 248/188.7 |
| 6,701,867 B1 | 3/2004 | Garrison | |
| 6,715,503 B2 | 4/2004 | Brooks, III | |
| 6,755,381 B1 * | 6/2004 | Levin et al. | 248/163.1 |
| 6,758,164 B2 | 7/2004 | Rich | |
| 6,908,067 B2 * | 6/2005 | Clasen | 248/533 |
| 6,925,754 B1 * | 8/2005 | Tearoe | 47/47 |
| 6,957,626 B2 | 10/2005 | Ela et al. | |
| 7,168,199 B2 * | 1/2007 | Krien et al. | 42/94 |
| 7,213,361 B1 * | 5/2007 | Perigo, Sr. | 43/21.2 |
| 7,246,783 B2 * | 7/2007 | Harold et al. | 248/545 |
| 7,434,772 B1 * | 10/2008 | Jou | 248/124.2 |
| 7,568,666 B2 * | 8/2009 | Kennedy | 248/121 |
| 2002/0185167 A1 * | 12/2002 | Lin et al. | 135/16 |
| 2004/0031443 A1 | 2/2004 | Ela et al. | |
| 2004/0206860 A1 * | 10/2004 | Bolinder | 248/156 |
| 2005/0161560 A1 * | 7/2005 | Kjellman | 248/163.1 |
| 2005/0211177 A1 | 9/2005 | Bescherer | |
| 2007/0045487 A1 * | 3/2007 | Luna-Keaton | 248/154 |
| 2007/0131824 A1 * | 6/2007 | Harold et al. | 248/156 |
| 2008/0099061 A1 * | 5/2008 | McKnight | 135/118 |

* cited by examiner

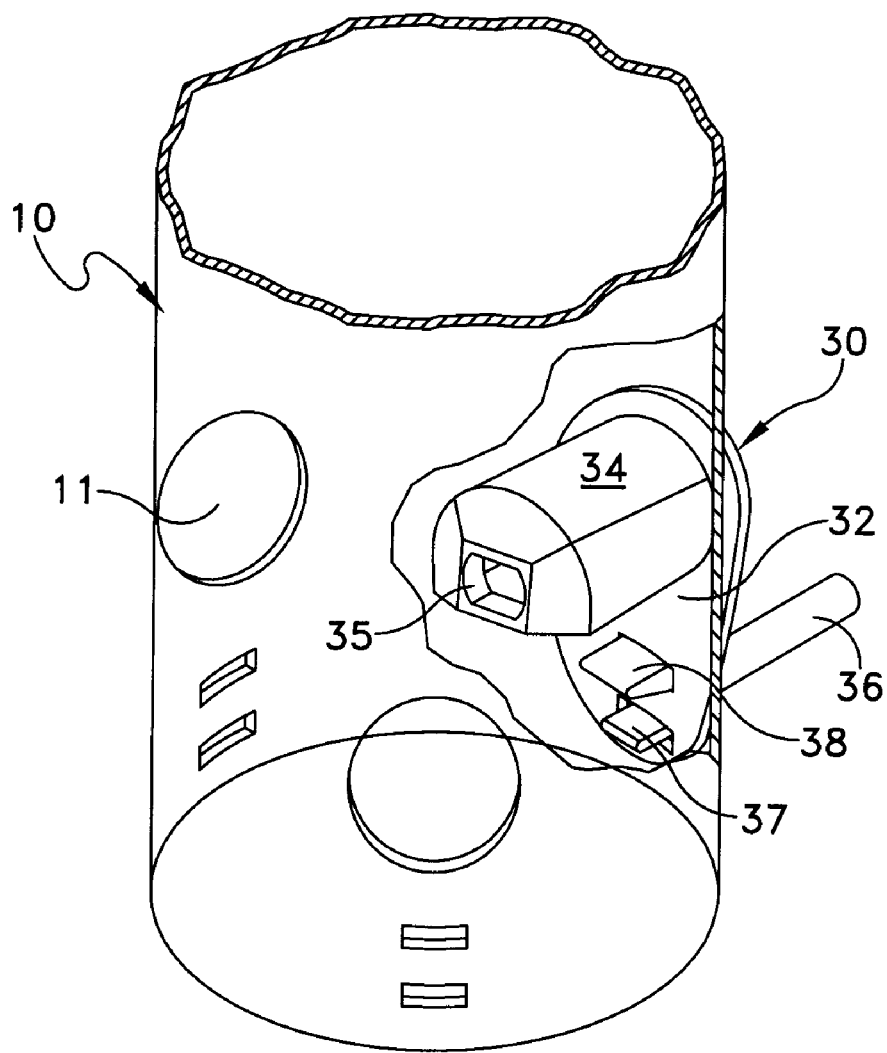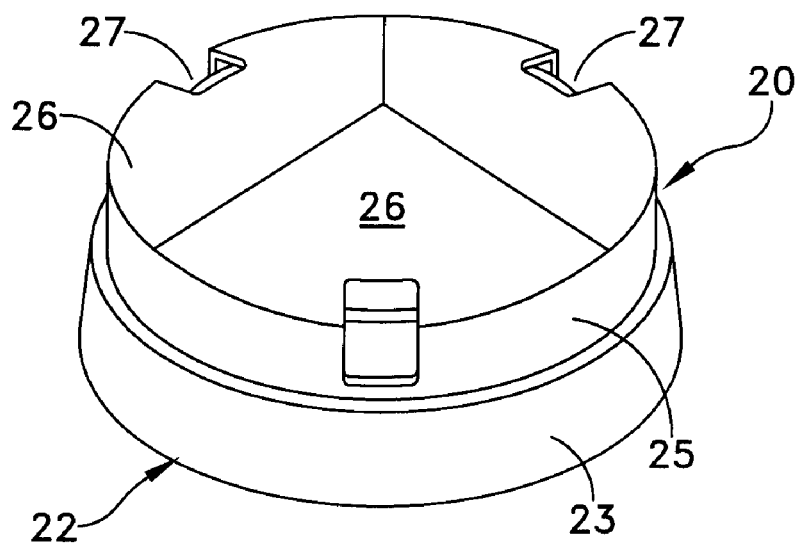
FIG. 8

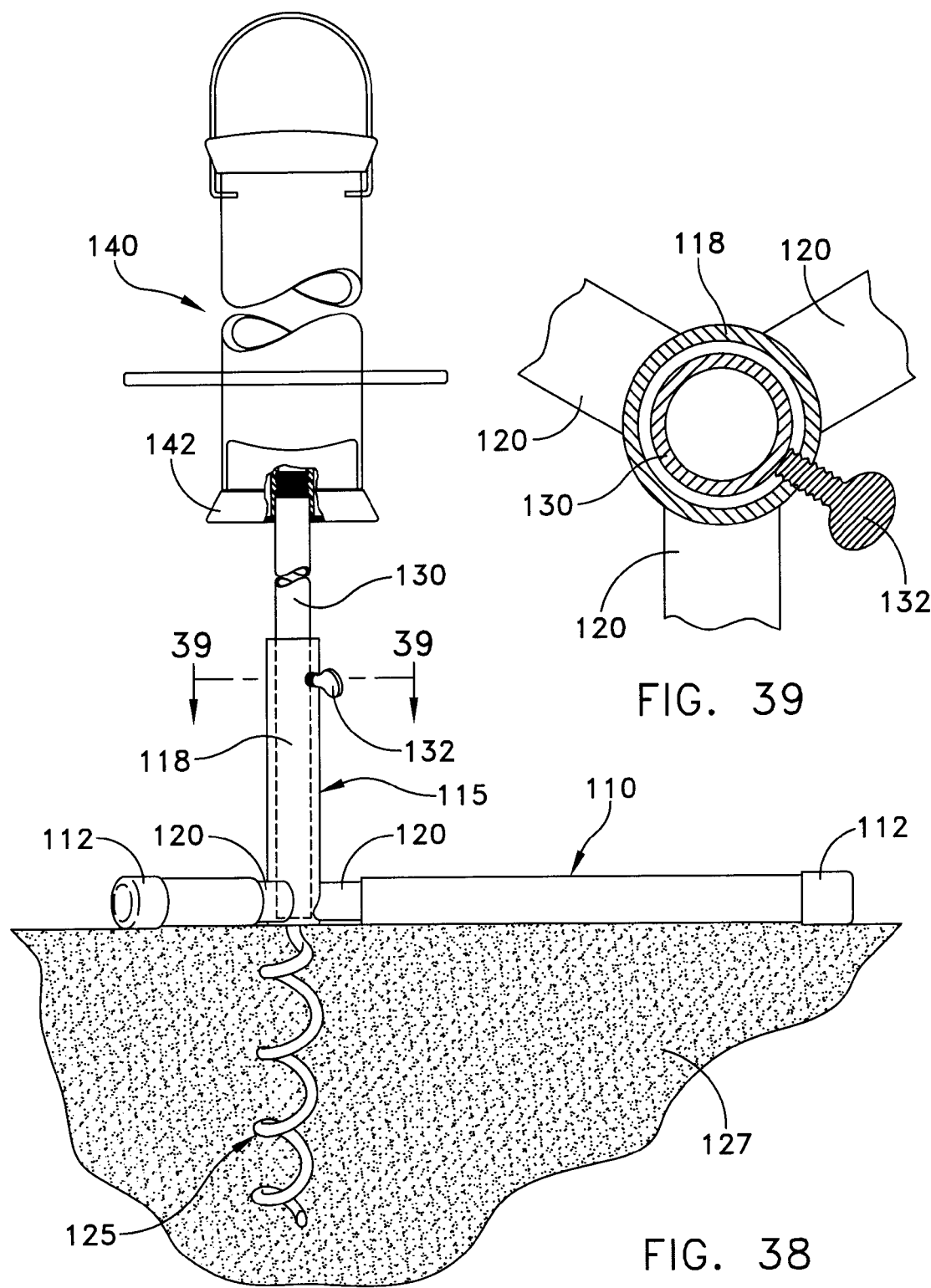

BIRD FEEDER

RELATED APPLICATION

This application is a divisional of application Ser. No. 11/295,917 filed on Dec. 7, 2005 and which is currently pending.

TECHNICAL FIELD

The present invention relates, in general, to a bird feeder and pertains more particularly to a bird feeder having a removable base.

BACKGROUND

The typical bird feeder available on the market has the base firmly attached to the bird seed container. This makes it difficult to clean the bottom end of the container housing.

Accordingly, it is an object of the present invention to provide a bird feeder with a removable or releasable base so as to facilitate cleaning of both the base and the lower end of the bird feeder container or housing.

Another object of the present invention is to provide a removable base for a bird feeder in which the base is held relatively firmly in place in its closed position and yet is relatively easy for the user to remove from the container housing.

Still another object of the present invention is to provide a bird feeder with a removable base in which the base can be readily removed by a user but that is not able to be removed by an animal such as a squirrel.

Another object of the present invention is to provide an improved support structure for a bird feeder.

SUMMARY OF THE INVENTION

The foregoing and other objects of the invention are achieved by providing a bird feeder that is comprised of a housing for storing bird feed therein, including one or more ports through which access is provided to the bird feed and having an open lower end and a base assembly adapted to close the open end of the housing. The base assembly has a main body portion adapted to fit within the housing at the open end of the housing so that the main body portion is rotatably fixed but removable with respect to the housing, and a manually operated latch coupled to the main body portion. The latch is supported for rotation with respect to the main body portion to releasably secure the base assembly to the housing.

In accordance with other aspects of the present invention one of the housing and the latch has a first engaging member and the other of the housing and the latch has a second engaging member adapted to releasably engage the first engaging member upon positioning the first and second engaging members adjacent one another; one or more bird feed perches extends from the housing under a port; the bird feed port may comprise an insert releasably engaged with the housing, the insert having one of the first and second engaging members; the first engaging member may comprise a projection internally of the housing and the second engaging member may comprise a slot and ridge on the latch for capturing said projection; the main body portion may have an open bottom into which the latch is disposed, the latch including stops spaced apart to engage said projection at opposite open and closed positions of said latch; and the main body portion of the base assembly may have an annular rim adapted to sealingly engage the housing at the open end of the housing.

In accordance with another embodiment of the present invention there is provided the bird feeder comprises a housing for storing bird feed therein, including at least two ports through which access is provided to the bird feed; at least two bird feed port inserts, each insert adapted to be received in a corresponding port and each having a hood portion extending into the housing; and an interconnecting member for interconnecting the hood portions of the inserts to one another with a snap fit to secure the inserts within the housing.

In accordance with still other aspects of the present invention each insert may further comprise a collar portion adapted to be positioned outside the housing and defined by an annular ridge that is urged against the housing wall about the port; each insert may further comprise a bird perch, formed on the collar portion, extending away from the housing and disposed under the port; and the interconnecting member may comprise a pair of resilient fasteners, one for each insert, each resilient fastener being adapted to be releasably secured to a receptacle formed in the hood portion of its corresponding insert.

In accordance with another embodiment of the present invention there is provided a bird feeder that includes a bird feed holder having open top and bottom ends; a plurality of feeding ports disposed in a sidewall defining the holder; a plurality of perches each associated with an inlet of an associated feeding port; a removable base for engaging with the bottom end of the holder, the removable base having a closed position for sealing the bottom end of the holder so as to retain the bird feed therein and an open position in which the base is removed from the holder to enable access to the bottom end of the holder; and a manually operated latch member supported by the base. The manually operated latch member is supported for radial engagement so as to enable releasable securing of the removable base to the holder.

In accordance with still other aspects of the present invention each feeding port may comprise a port member having the perch integrally formed therewith; the port member may further include a projection extending internally of the housing for locking engagement with said latch member; may include a plurality of port members circumferentially disposed about the holder and a like plurality of projections; the latch member may have a plurality of latch pieces, the same in number as the number of projections, and circumferentially disposed so that each latch piece is engageable with a projection; each latch piece may be depressable radially so as to disengage it from a projection; may include a stop over each projection; each projection may be an internal extension of a perch; and may include an interconnecting member comprising a pair of resilient fasteners, one for each port, each resilient fastener being adapted to be releasably secured to a receptacle formed in a hood portion of its corresponding port.

In accordance with another embodiment of the invention there is provided a support apparatus for a bird feeder that comprises a plurality of support arms; an upright member; the plurality of support arms being constructed and arranged so as to extend radially from a base of the upright member; a ground engagement element extending downwardly from the base of the upright member and for engagement into the ground for support of the upright member; and means for attaching the bird feeder to the upright member.

In accordance with still other aspects of the present invention the support arms are disposed in a symmetric pattern and are slid onto respective legs that extend radially from the base of the upright member, and the ground engagement element comprises a screw element fixed to the base of the upright member. The support apparatus may include end caps on the support arms, the upright member may be a hollow tube and the means for attaching may include a thumb screw for attaching a support pole to the bird feeder.

DESCRIPTION OF THE DRAWINGS

Numerous other objects, features and advantages of the present invention should now become apparent upon a reading of the following detailed description taken in conjunction with the accompanying drawings, in which:

FIG. 8 is a fragmentary perspective view of the base of the feed container illustrating one of the port members in place and furthermore illustrating the base assembly;

FIG. 38 is an illustration of the support apparatus of the present invention as engaged in the ground and as for supporting a bird feeder;

FIG. 39 is a cross-sectional view taken along line 39-39 of FIG. 38; and

DETAILED DESCRIPTION

Figure 10:
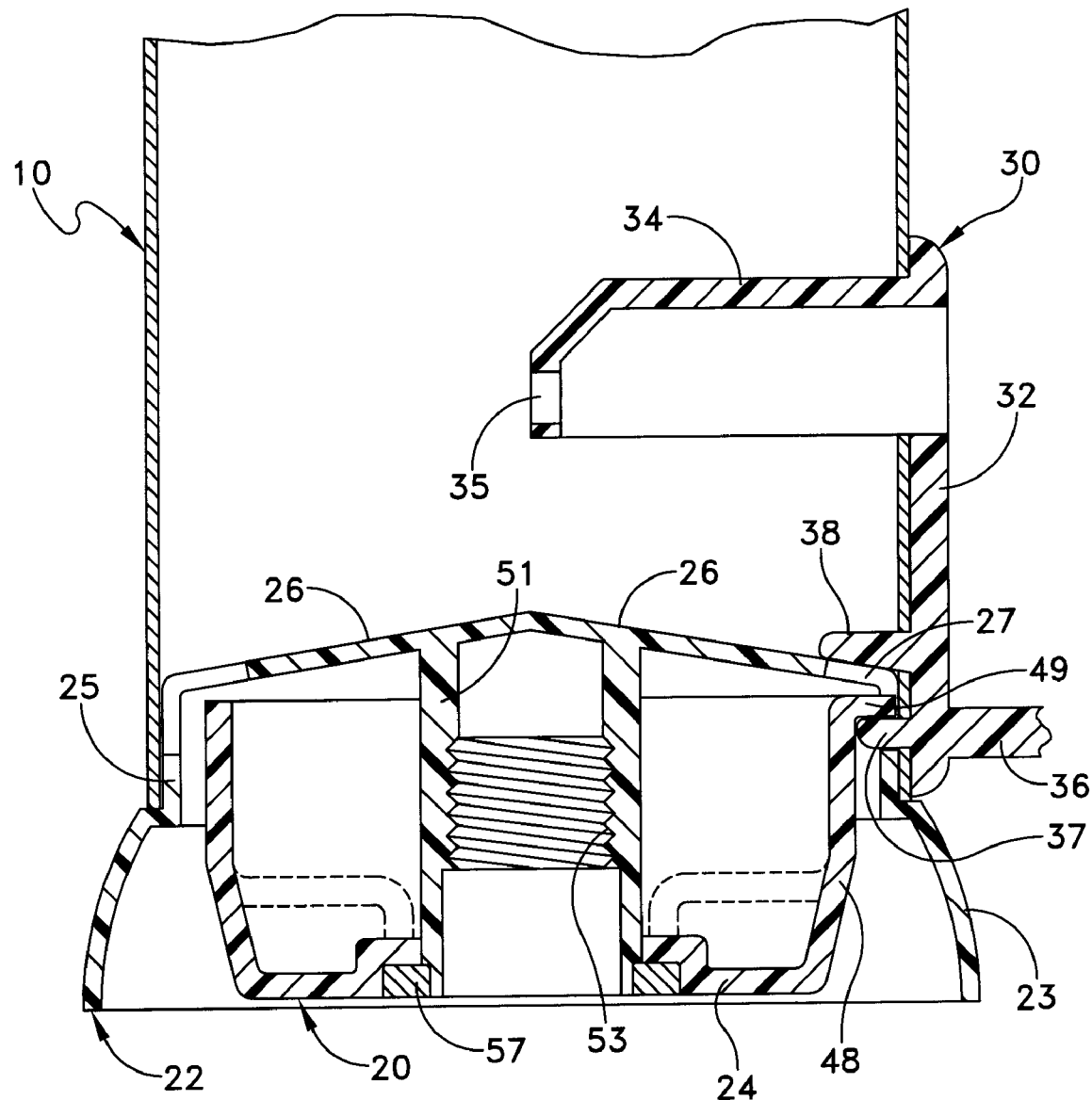
FIG. 10 is a cross-sectional view taken along line 10-10 of FIG. 9.
Figure 11:
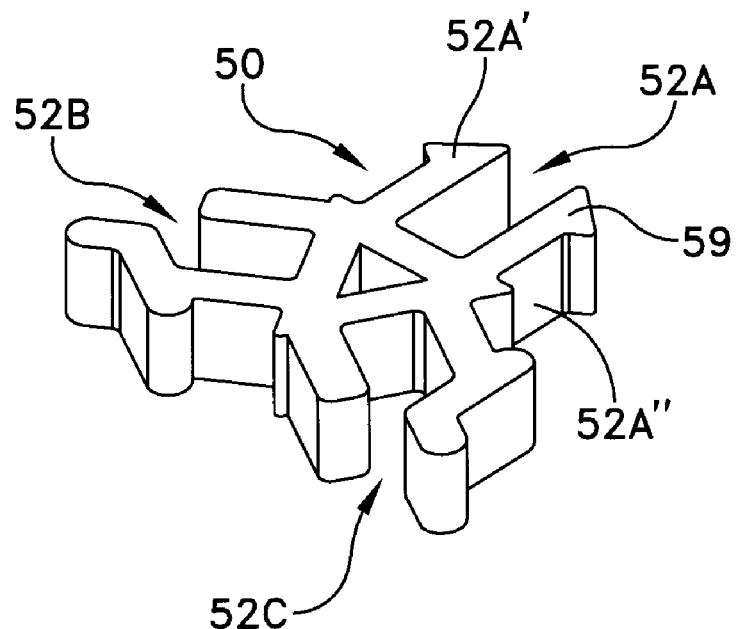
FIG. 11 is a perspective view of the interconnecting member that is used for coupling together the port members.
Figure 12:
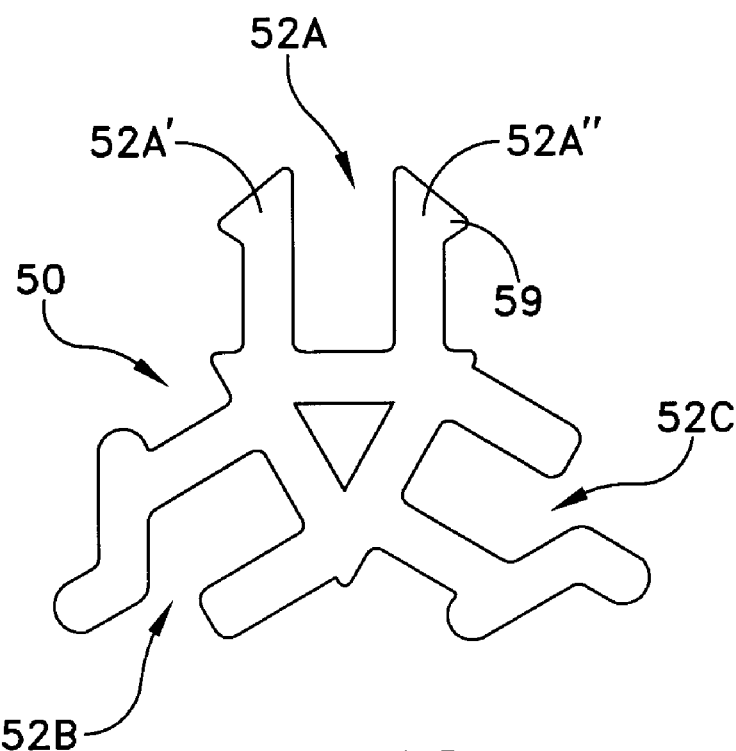
FIG. 12 is a plan view of the interconnecting member of FIG. 11.

A first embodiment of the present invention is illustrated in FIGS. 1-18. In this embodiment the base is removably supported from the feed container. The base is removable by means of a set of latch fingers that are depressed in a radial direction to release the base from the bottom end of the feed container. The embodiment of FIGS. 1-18 also illustrates the construction of the interconnecting member that is used for connecting together the separate port members. The preferred embodiment of the interconnecting matter is illustrated in FIGS. 11 and 12.

Figure 1:
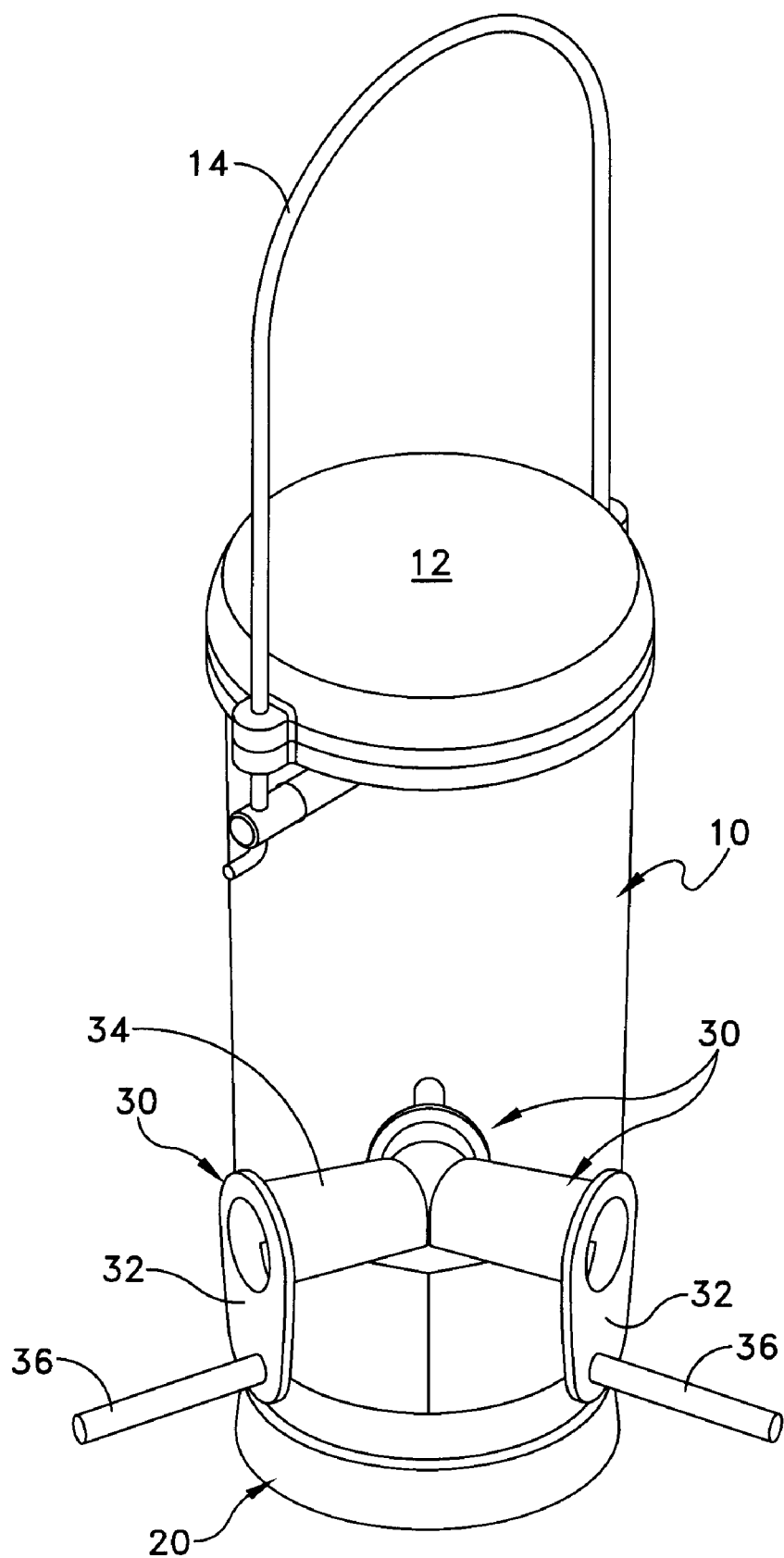
FIG. 1 is a perspective view of a bird feeder in accordance with the first embodiment of the present invention.

Reference is now made to FIG. 1 which is a perspective view of a bird feeder constructed in accordance with the principles of the present invention. This feeder includes a container or holder 10 that is preferably constructed of a clear plastic material. The container 10 holds the bird seed or other type of bird feed. The container 10 is open at its top and bottom. A top or cover 12 is supported over the top end of the container 10. The top 12 may be supported on a bale wire 14 that enables the top 12 to be slid up and down the wire. The top 10 is moved upwardly for the purpose of introducing seeds into the container and is illustrated in FIG. 1 in its bottom closed position.

Figure 5:
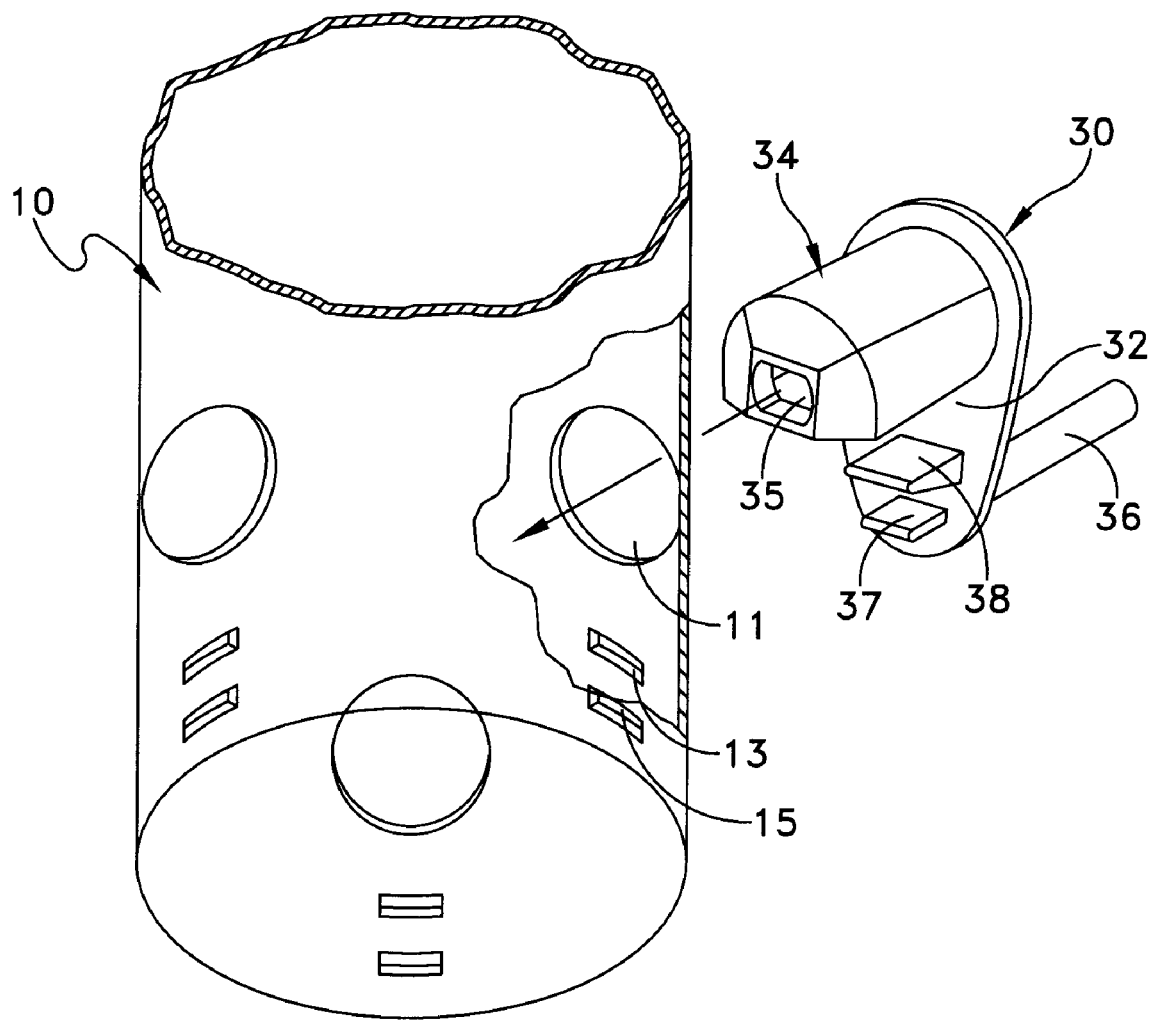
FIG. 5 is a fragmentary perspective view illustrating the bottom end of the bird seed container and the construction of one of the port members.
Figure 9:
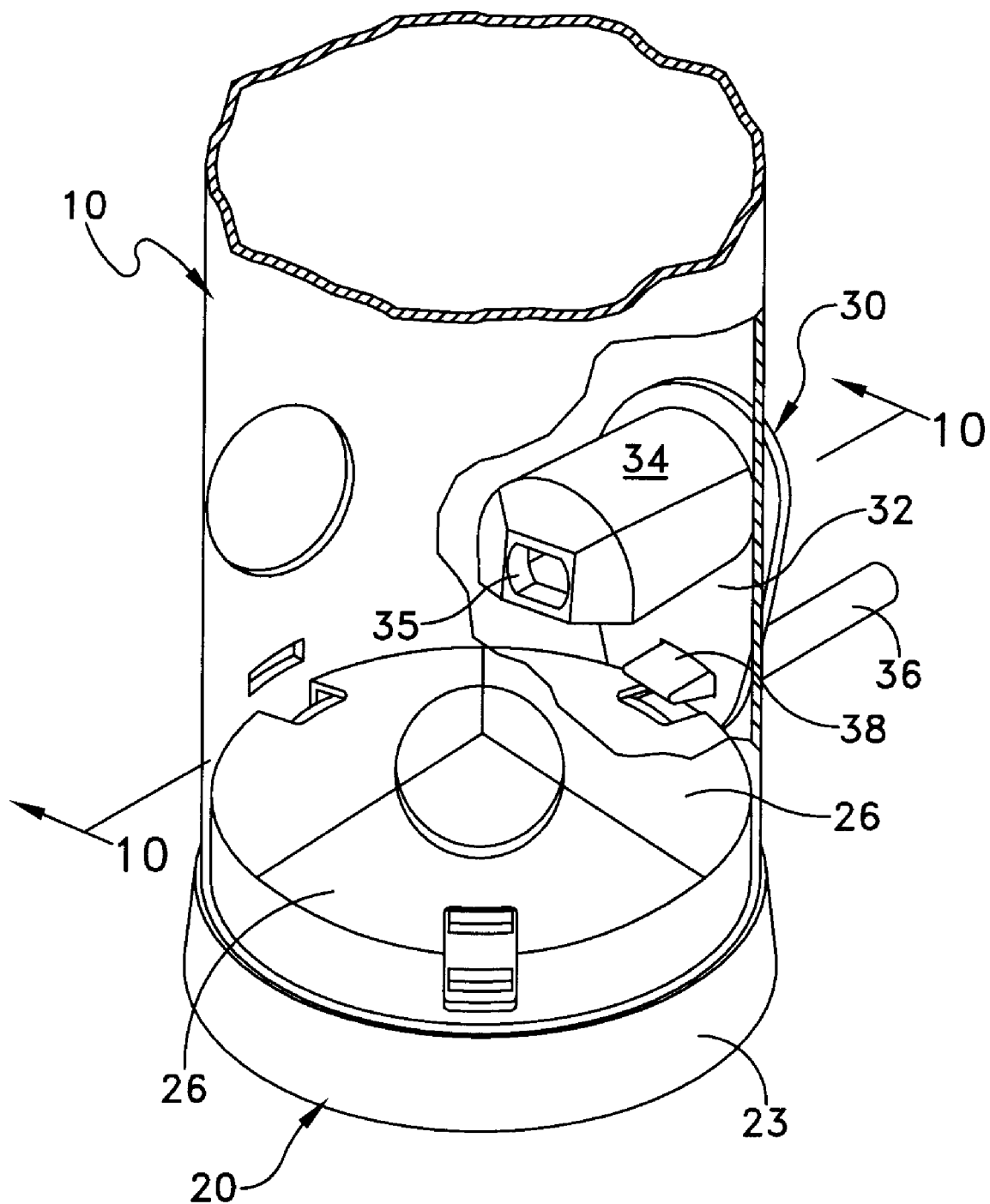
FIG. 9 is a perspective view illustrating the base supported within the bottom end of the bird feed container.

FIG. 1 also illustrates the base assembly 20 of the bird feeder, along with a plurality of port members 30. In the particular embodiment illustrated in FIG. 1, three port members are used, each extending radially in the container and symmetrically disposed. For further details of each of the port members 30, refer to FIGS. 5-7. Each port member is comprised of a collar 32, a hood 34 and a perch 36. The collar, hood and perch are preferably all integrally formed of a single piece of plastic. The hood 34 is adapted to pass through a circular aperture 11 in the side wall of the container 10. The inner end of the hood 34 is provided with a passage 35 for receiving an interconnecting member. The collar 30 also supports the projection 37 and a stop 38. The slits 13 and 15 in the sidewall of the container 10 are adapted to respectively receive the stop 38 and the projection 37. FIG. 5 shows the port member 30 exploded away from the container with the hood 34 in alignment with the aperture 11. FIG. 8 shows the port member 30 in place within the container with the stop end projection fitting within their associated slits. FIGS. 9 and 10 also show the position of the port member as engaged with the container or holder 10.

Figure 7:
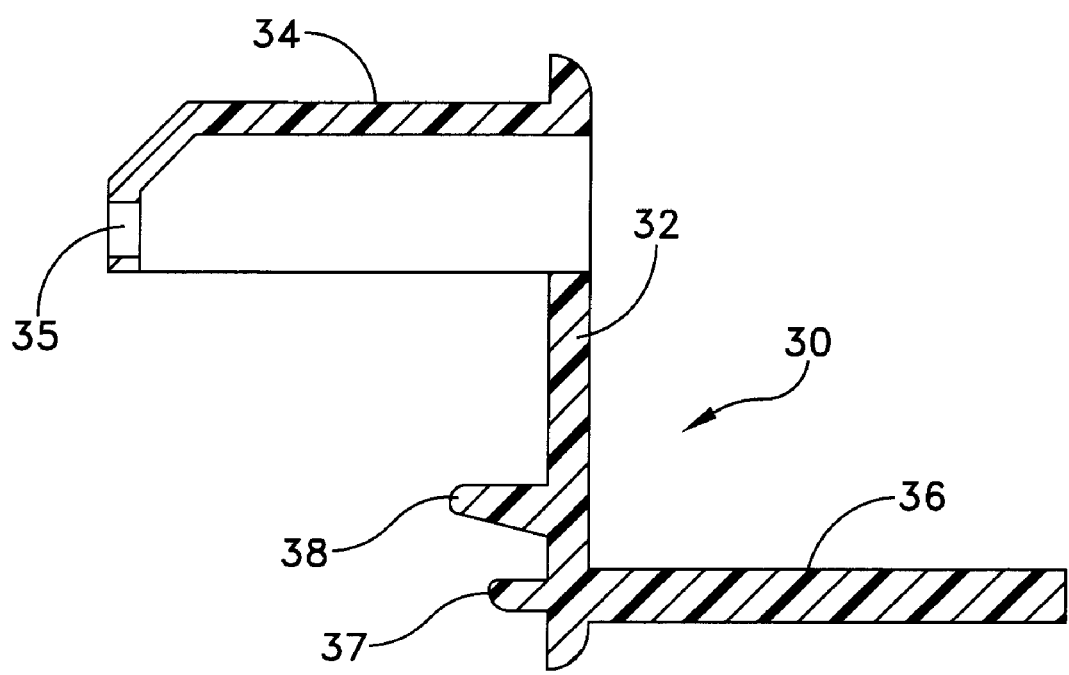
FIG. 7 is a cross-sectional view through the port member as taken along line 7-7 of FIG. 6.

As noted in FIGS. 7 and 10, the projection 37 is integral with the collar 30 and essentially is an internal projection or extension of the perch 36. As indicated in FIG. 10, the stop 38 defines a limit for the seating of the base assembly 20 in the bottom of the container 10. FIG. 10 illustrates the stop 38 bearing against a top wall of the base assembly. The projection 37, as particularly illustrated in FIG. 10, is for engagement with the base assembly. FIG. 10 illustrates the locked position of the base assembly.

Figure 2:
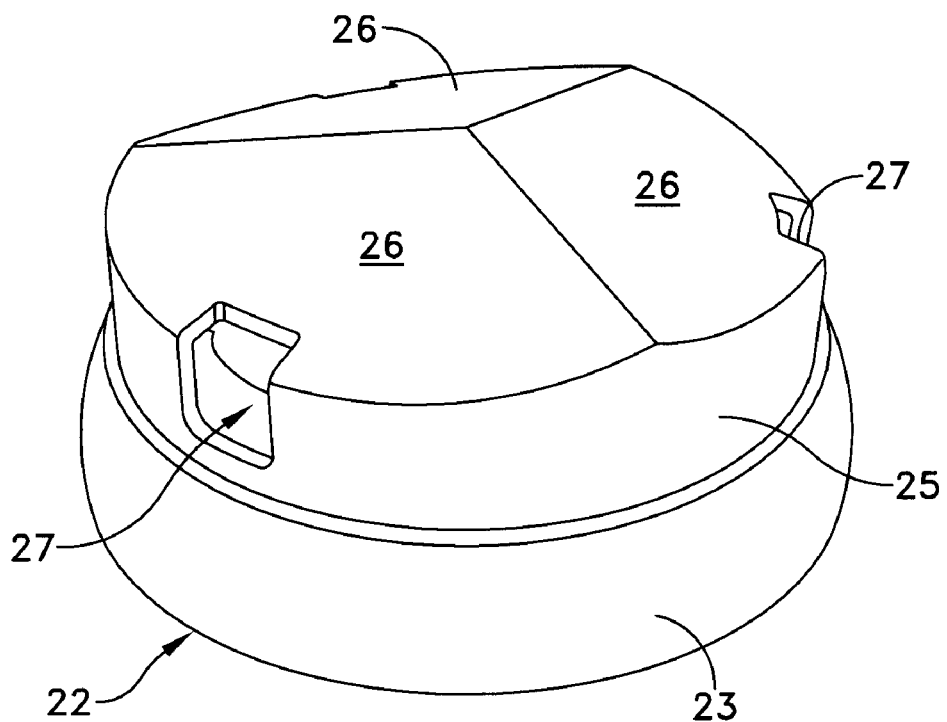
FIG. 2 is a perspective view of the bird feeder base of FIG. 1.
Figure 3:
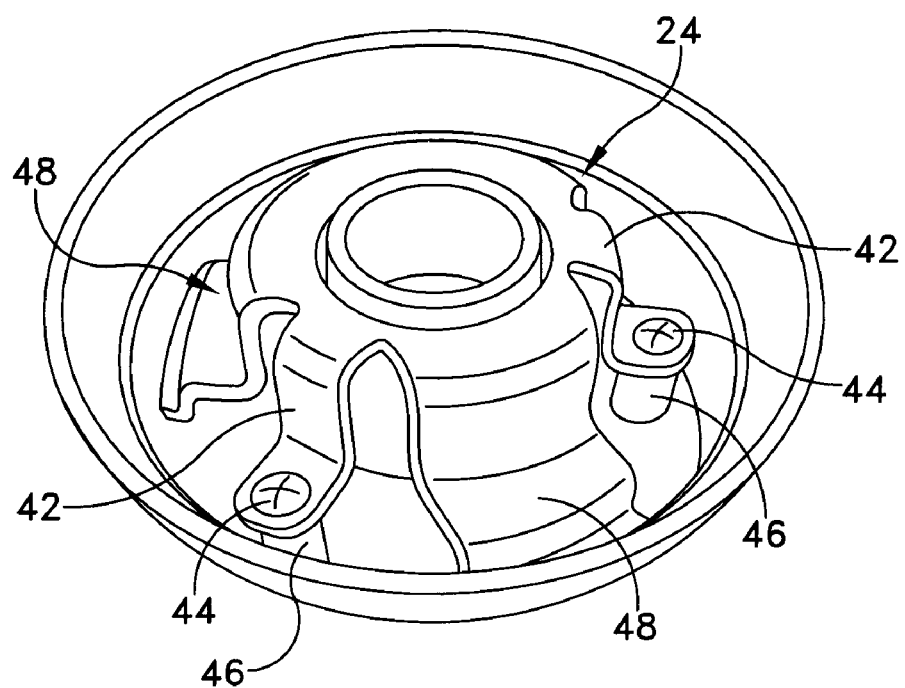
FIG. 3 is a perspective view directed at the bottom of the base.
Figure 4:
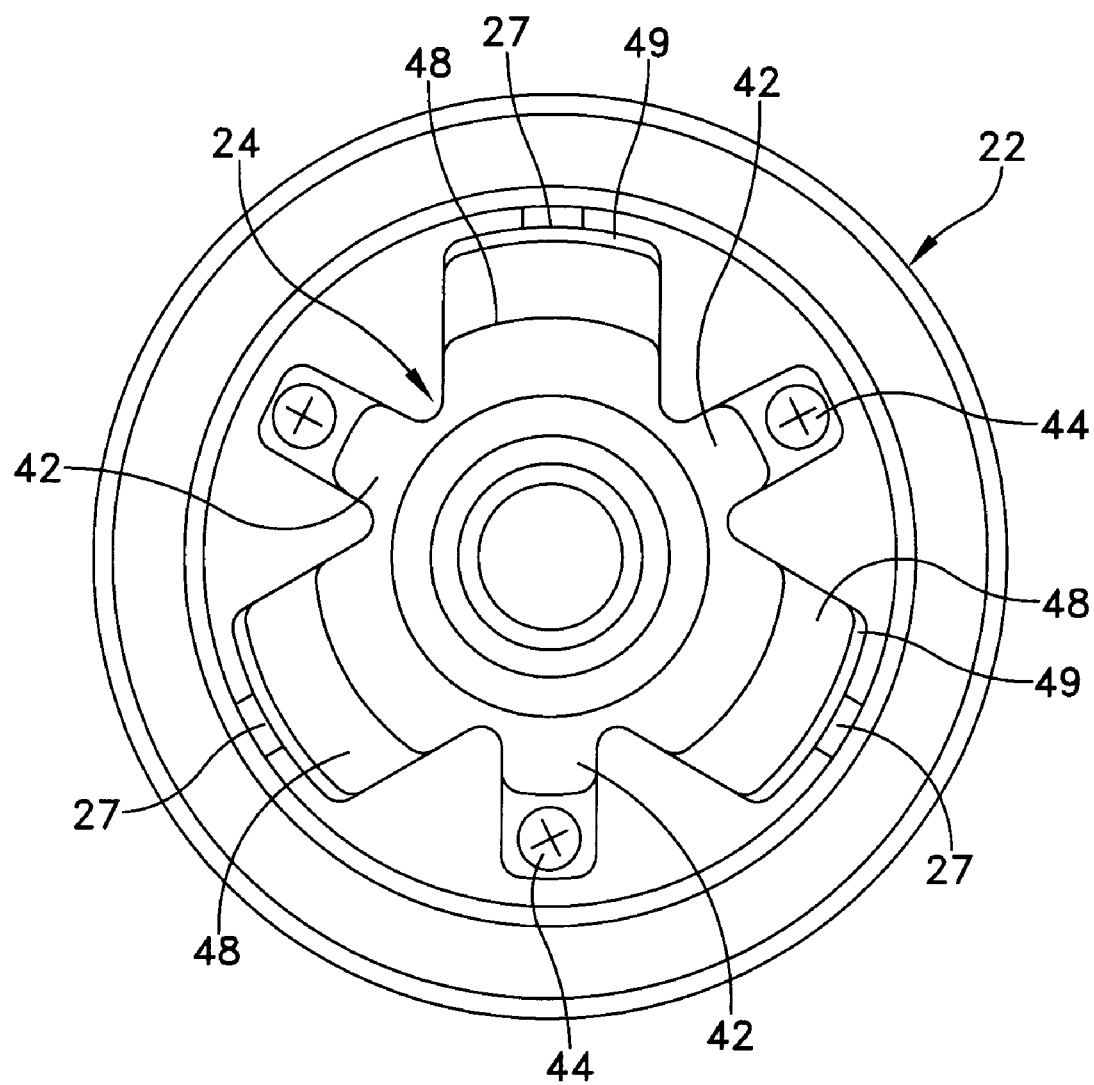
FIG. 4 is a plan view of the base as viewed from the bottom.

Reference is now made to FIGS. 2-4 for further details of the base assembly 20. The base assembly 20 is basically comprised of two components including the main base 22 illustrated in FIG. 2 and the latch member 24 illustrated in FIG. 3. Refer also to the cross-sectional view of FIG. 10 that illustrates these components. The main base 22 includes a circumferential base rim 23 and circumferential wall 25. The top of the base 22 is formed by three tapered walls 26 each of which is in alignment with a port member and each of which has formed therein a slot 27. The projection 37 on the port member is adapted to slidably engage in the slot 27. The surfaces 26 are tapered so as to direct feed toward the port member.

The latch member 24, such as illustrated in FIGS. 3, 4 and 10 is comprised of a series of support legs 42 that are used for supporting the latch member from the base 22. For this purpose there are provided a series of screws or bolts 44 and support posts 46. The latch member 24 also includes three latch fingers 48, each of which is adapted to engage with one of the projections 37. In this regard, refer to FIG. 10 which illustrates the end lip 49 of the finger 48 engaged with the projection 37. FIG. 10 shows the locked position of the base relative to the container 10.

Figure 18:
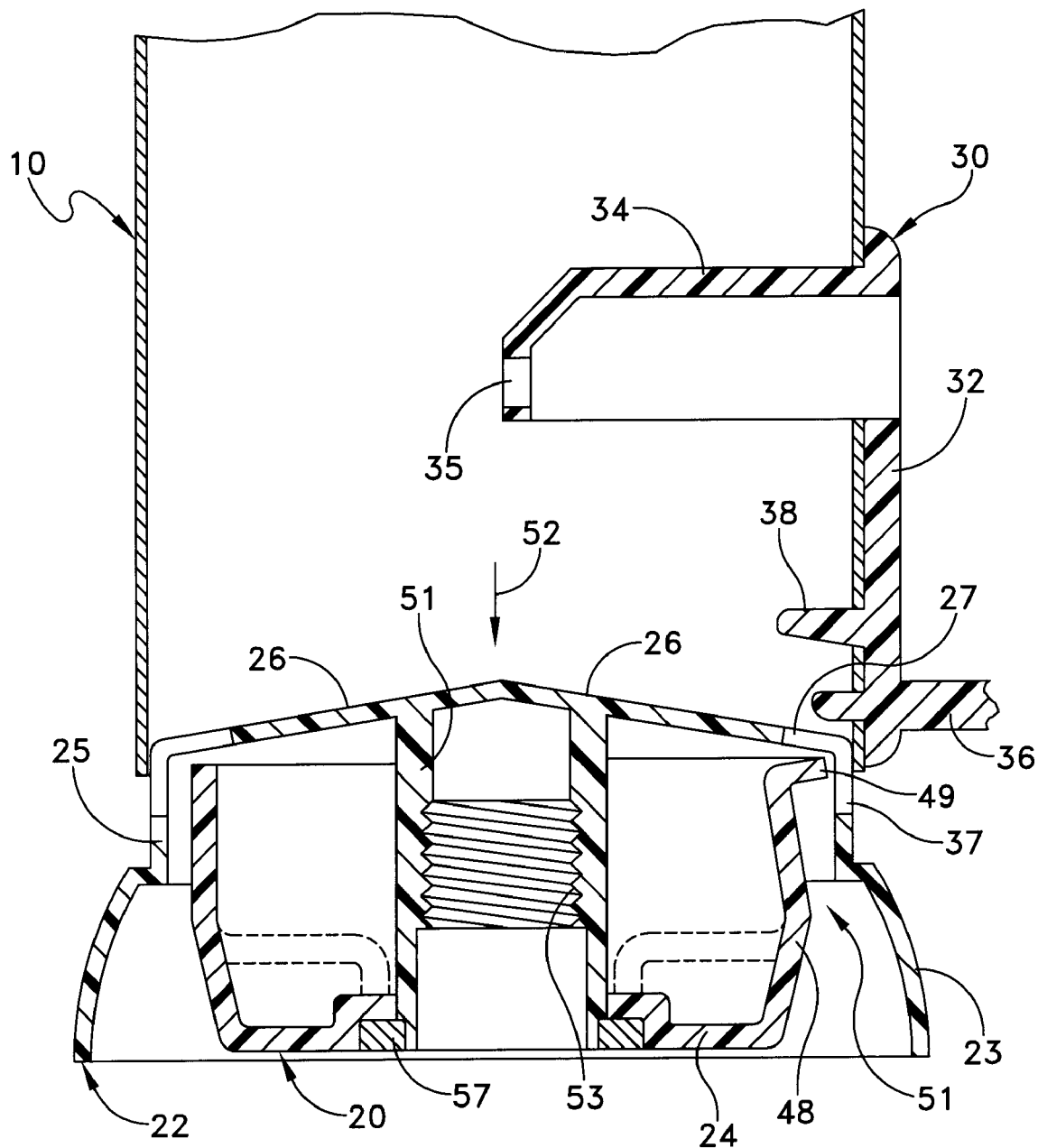
FIG. 18 is a cross-sectional view similar to that depicted in the cross-sectional view of FIG. 10 but showing the manner in which the latch member is released.

The base is released from the container by means of depressing each of the three latch fingers 48. One of the latch fingers 48 is illustrated in FIG. 18 having been depressed in the direction of the arrow 51. This disengages the end lip 49 away from the slot 27 allowing the base to be slid downwardly in the direction of arrow 52 in FIG. 18. The lip 49 is thus disengaged from the projection 37. In FIG. 18 the lip 49 is shown extending in the slot 27. In an alternate embodiment the lip 49 may extend through a top slot above the wall 26.

Figure 13:
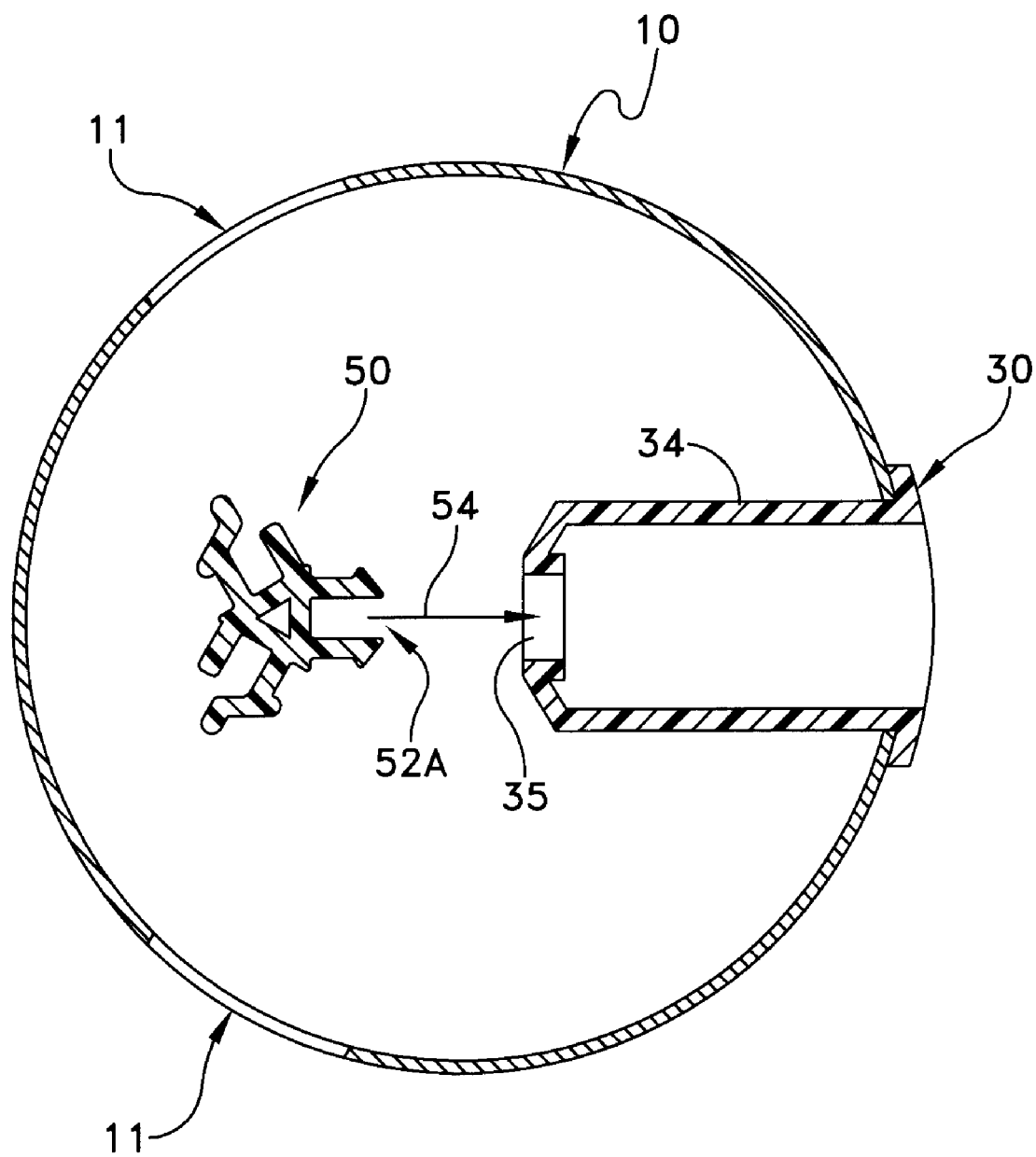
FIG. 13 is a cross-sectional view illustrating the interconnecting member as positioned relative to the port member.
Figure 14:
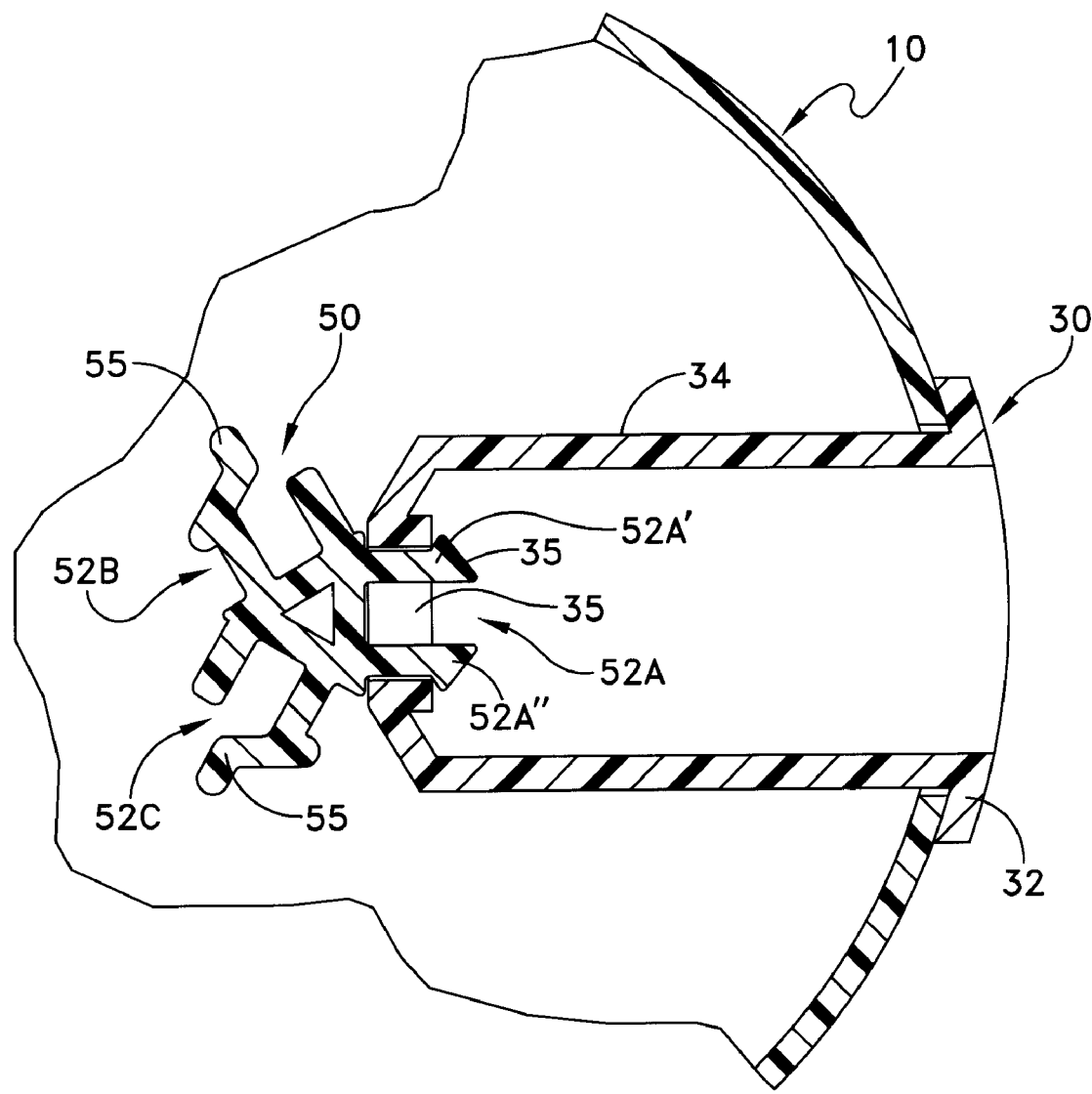
FIG. 14 is a cross-sectional view with the interconnecting member engaged with the port member.

Reference is now made to the interconnecting member 50 shown in further detail in FIGS. 11 and 12. The member 50 is used to interconnect the three port members 30. As such, the interconnecting member 50 has three sets of legs identified as a leg set 52A, 52B and 52C. The interconnecting member 50 may constructed of a lightweight plastic material or a lightweight spring steel material and each of the separate legs is able to be partially deflected so as to engage with the hood portion 34 of the port member. More particularly and as illustrated in FIG. 13, the leg set 52A is shown as movable in the direction of arrow 54 to engage with the end passage 35 in the hood 34. The leg set 52A engages in the passage 35. FIG. 14 illustrates the main leg set 52A engaged fully in the passage 35. The pointed ends of each of the legs of the set 52A provides a tight locked interengagement between the member 50 and the port member 30.

Figure 15:
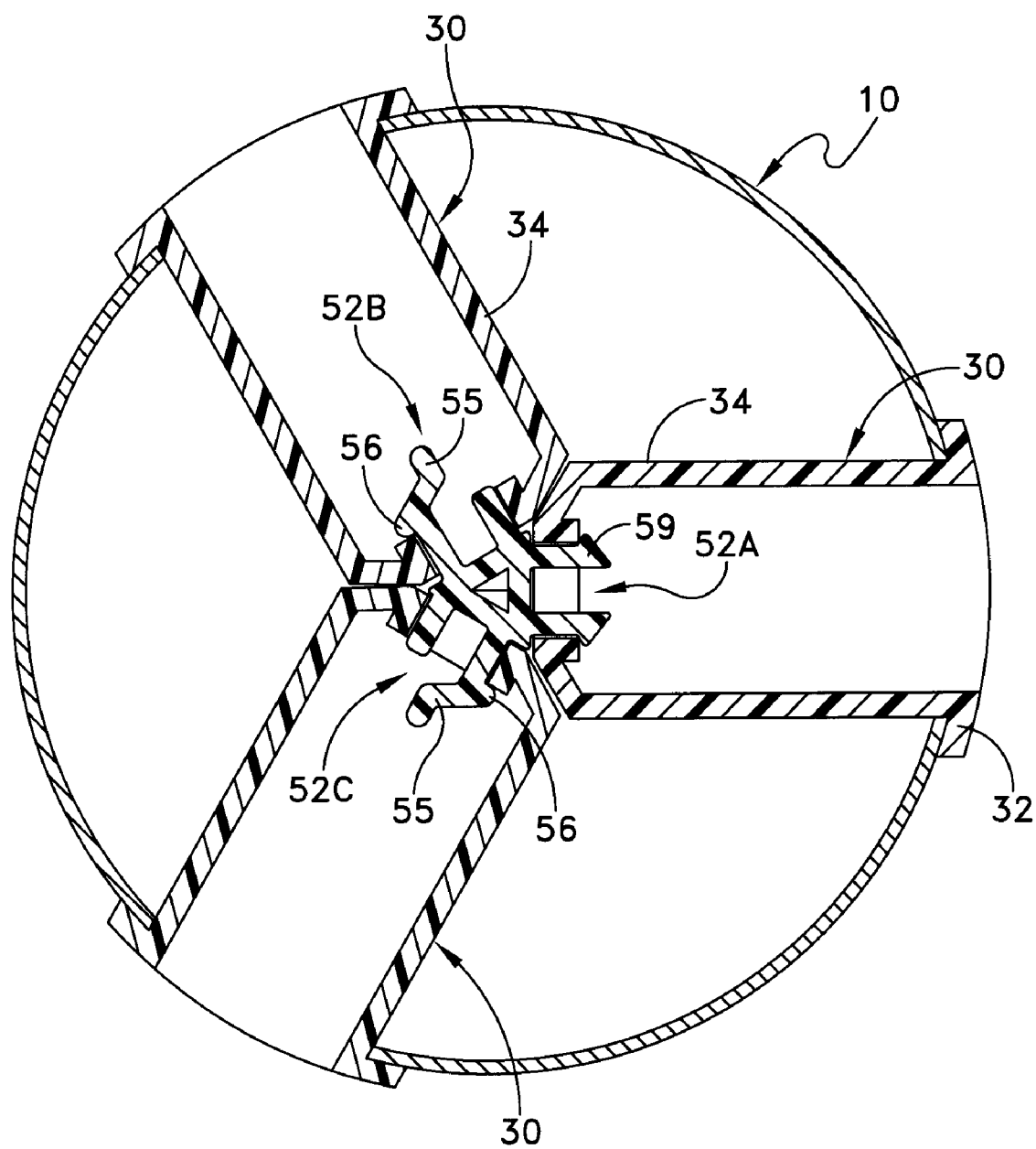
FIG. 15 is a cross-sectional view showing the interconnecting member as coupled with three port members.
Figure 16:
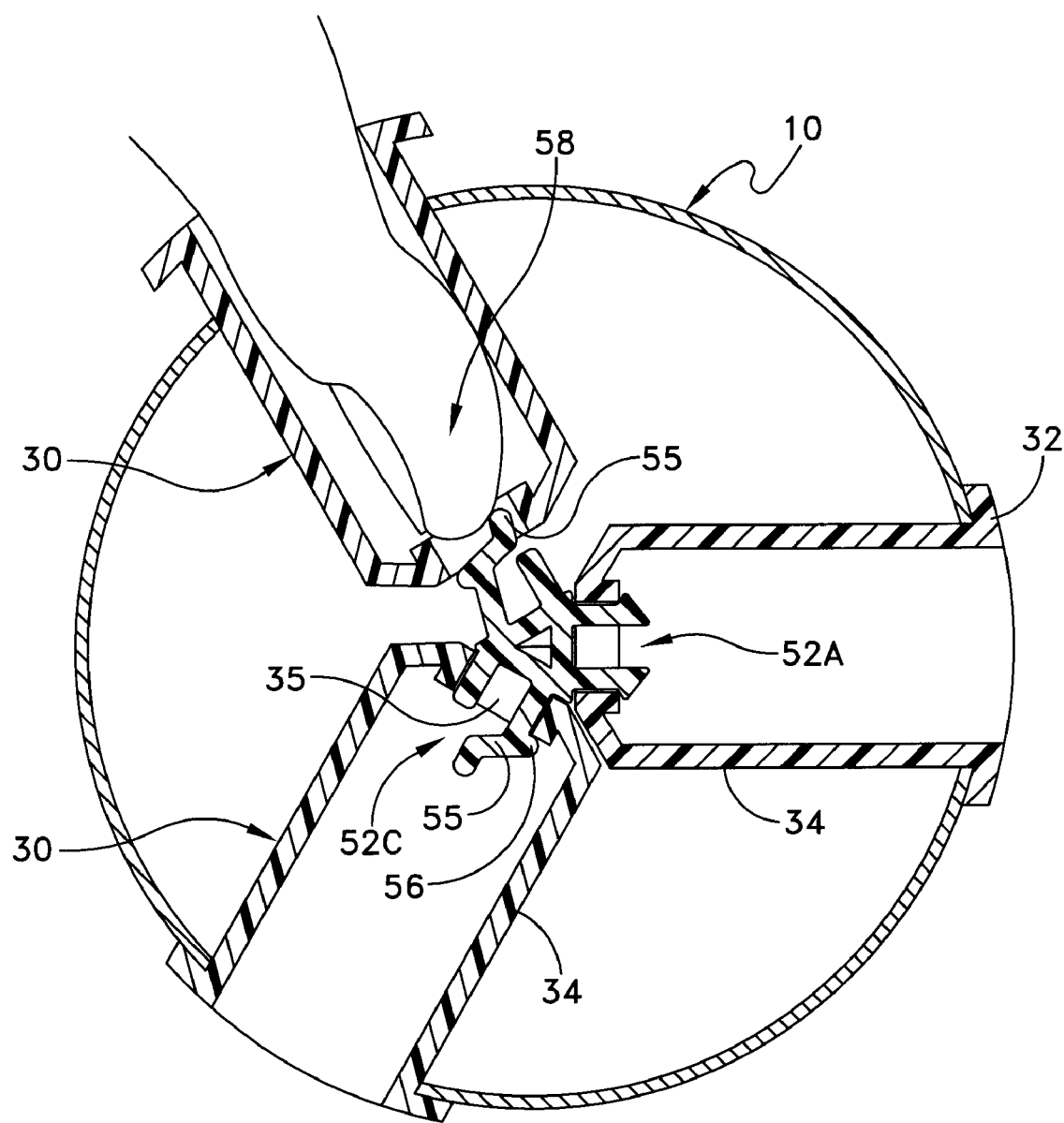
FIG. 16 is a cross-sectional view similar to that depicted in FIG. 15 and illustrating the manner in which a port member may be released at the interconnecting member.
Figure 17:
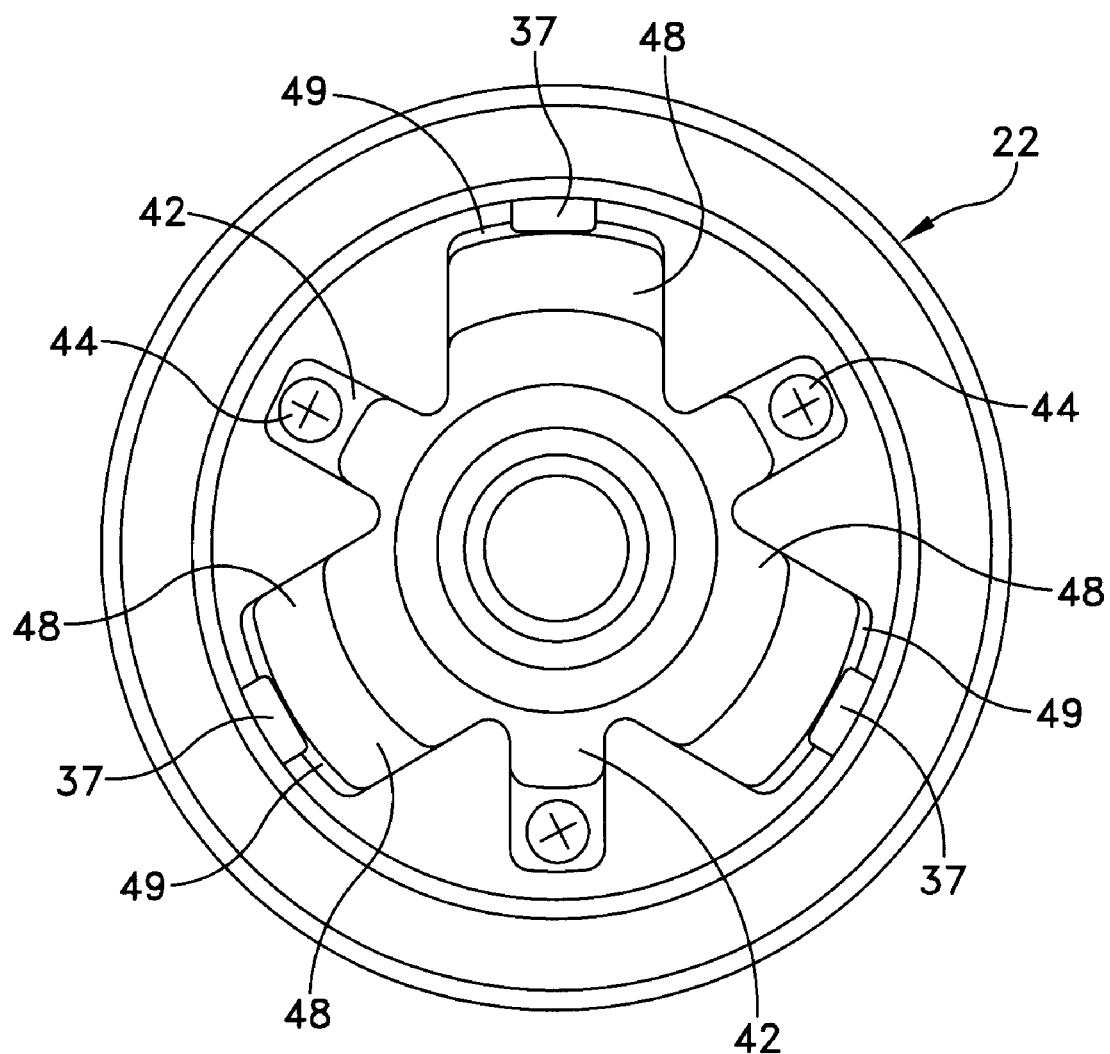
FIG. 17 is a bottom plan view of the base assembly as engaged with the container.

Refer now to FIGS. 15 and 16. This illustrates the manner in which the other leg sets 52B and 52C engage with the two other port members 30. FIG. 15 shows all port members interlocked with the interconnecting member 50. One of the legs 55 of each set 52B and 52C has an engagement lip 56 that enables the port member to interlock with the interconnecting member. At the same time, as illustrated in FIG. 16, the leg 55 may be engaged by the user's thumb 58 to depress the leg 55 so that the port member 30 that is retained by the leg 55 can then be disengaged. FIG. 16 shows the thumb 58 engaging the leg 55 and the port member 30 being partially withdrawn.

Figure 19:
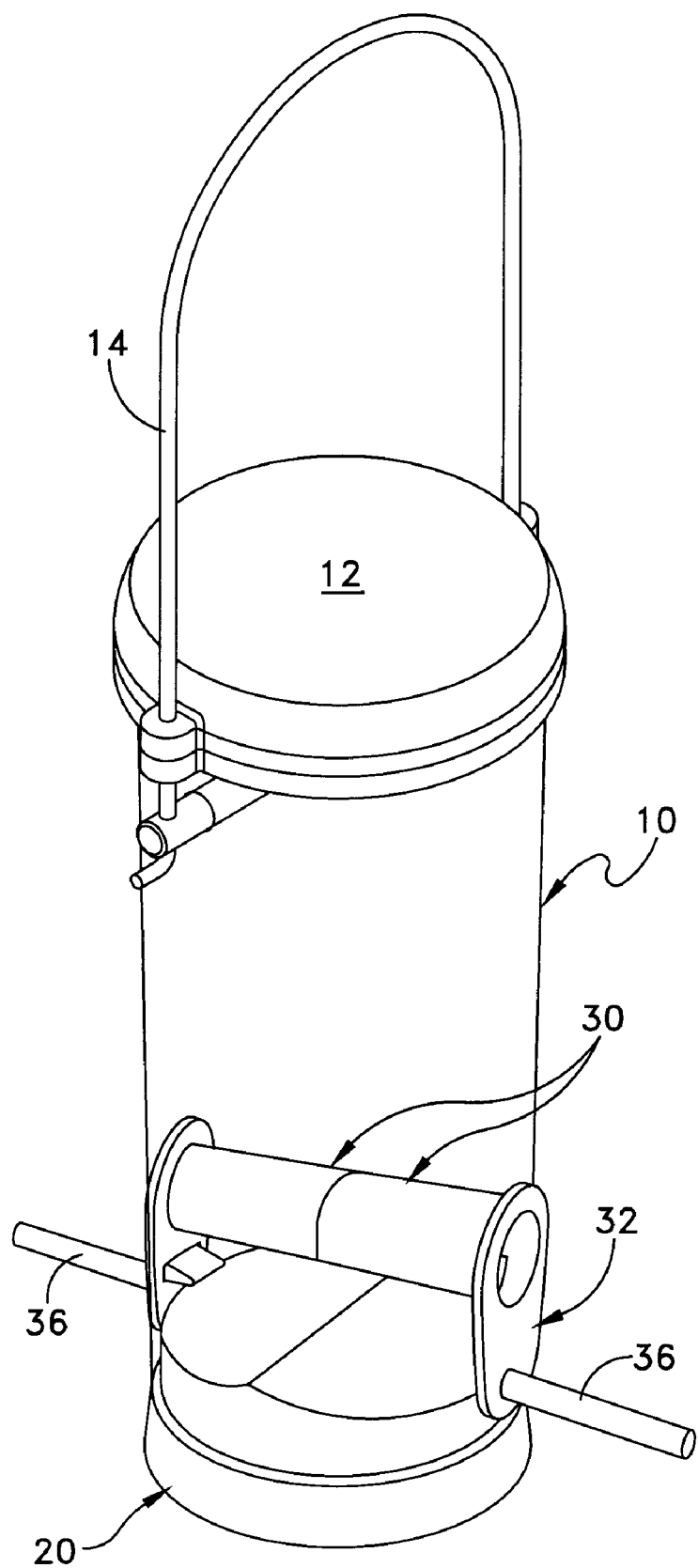
FIG. 19 is a perspective view of a second embodiment of a bird feeder in accordance with the present invention.
Figure 20:
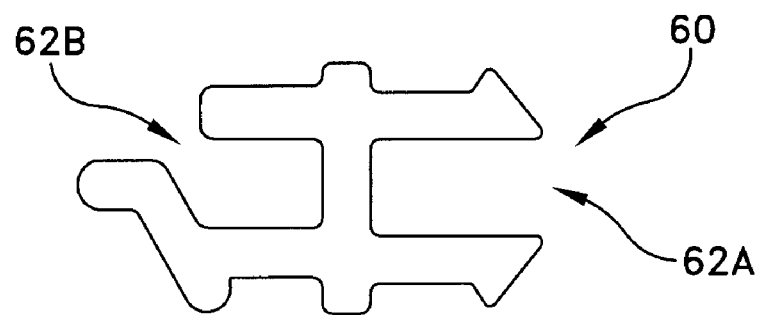
FIG. 20 is a further embodiment of an interconnecting member.
Figure 21:
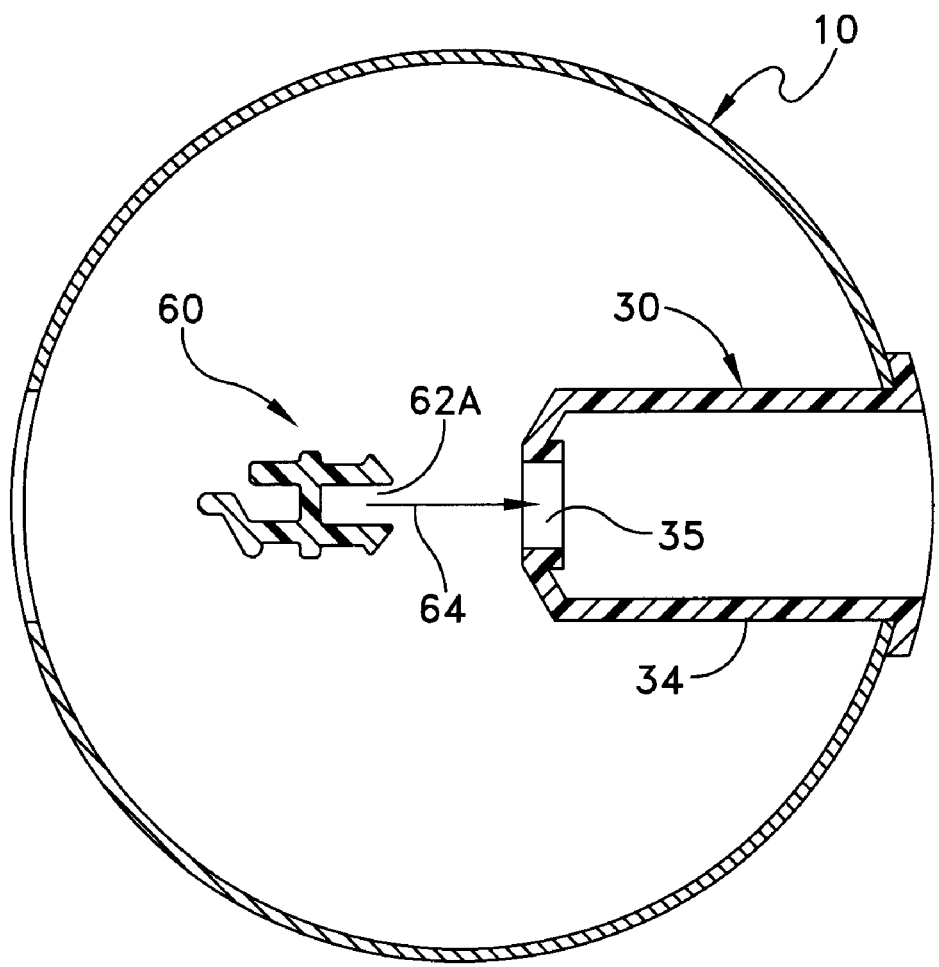
FIG. 21 is a cross-sectional view illustrating the interconnecting member of FIG. 20 as used with a port member.
Figure 22:
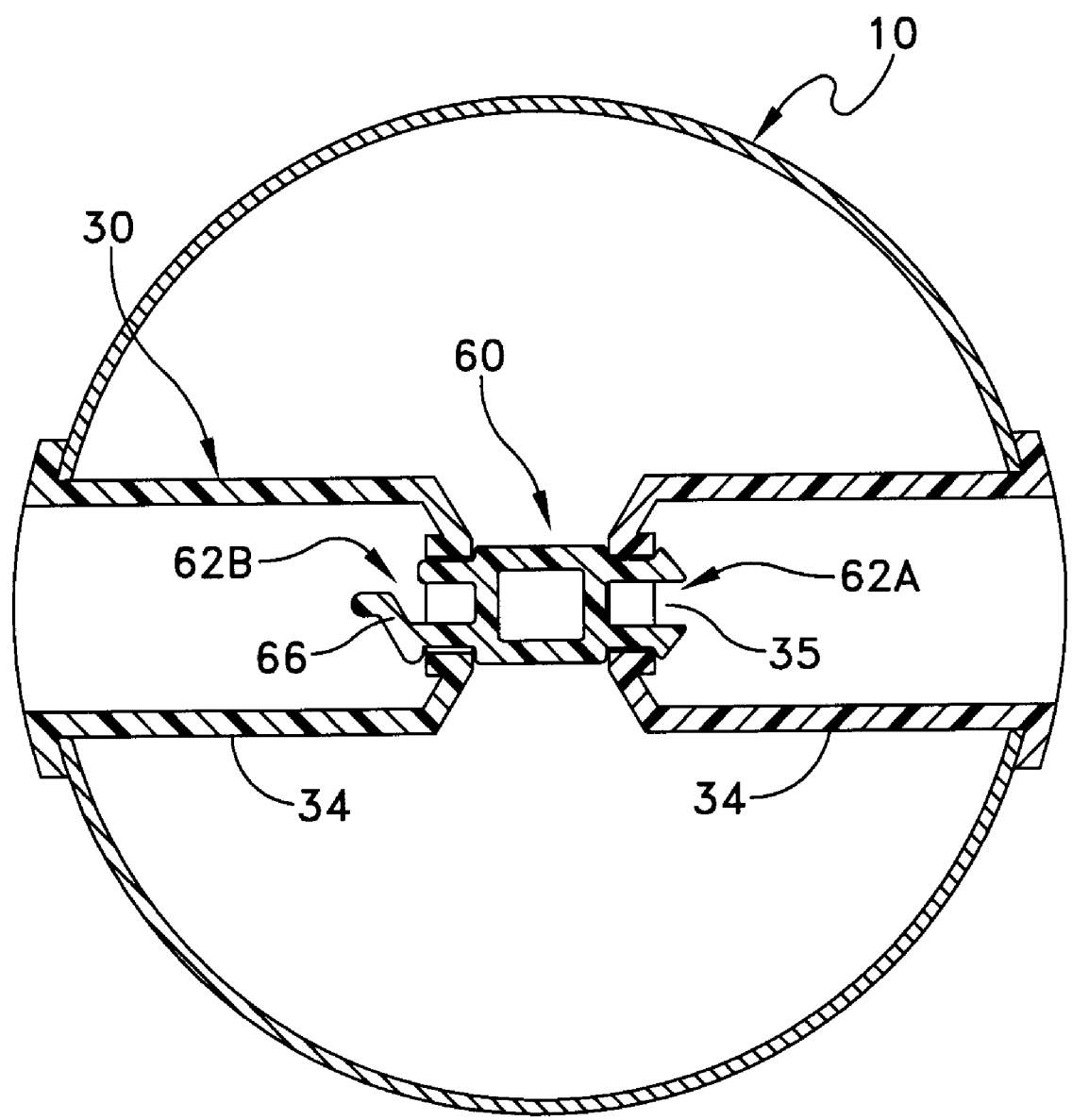
FIG. 22 is another cross-sectional view illustrating the interconnecting member of FIG. 20 as used for connecting together two oppositely disposed port members.

Reference is now made to FIGS. 19-22 for an illustration of a second embodiment of the present invention. This embodiment is similar to that described in FIGS. 1-18. However, in the embodiment of FIGS. 19-22, only two port members 30 are employed. These port members are disposed in line with each other as illustrated in FIGS. 19 and 22. FIG. 20 illustrates the construction of the interconnecting member 60 that is employed with this embodiment. This interconnecting member includes only two sets of legs, namely leg sets 62A and 62B. The leg set 62A interlocks with the aperture 35 in the hood 34, as illustrated in FIG. 21. FIG. 22 illustrates the other leg set 62B engaging with the other hood 34. The other leg set 62B also includes the leg 66, similar to the leg 55 depicted in FIG. 16. This is the leg that may be depressed by the user's thumb to release the interconnecting member, enabling the separate port members to be disengaged from the housing.

Figure 6:
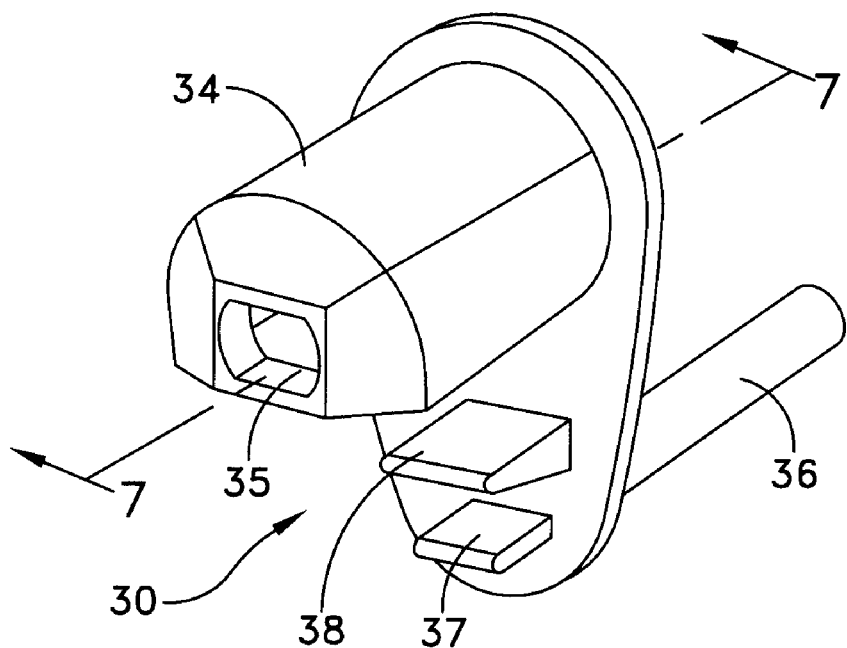
FIG. 6 is a perspective view of the port member of FIG. 5.
Figure 23:
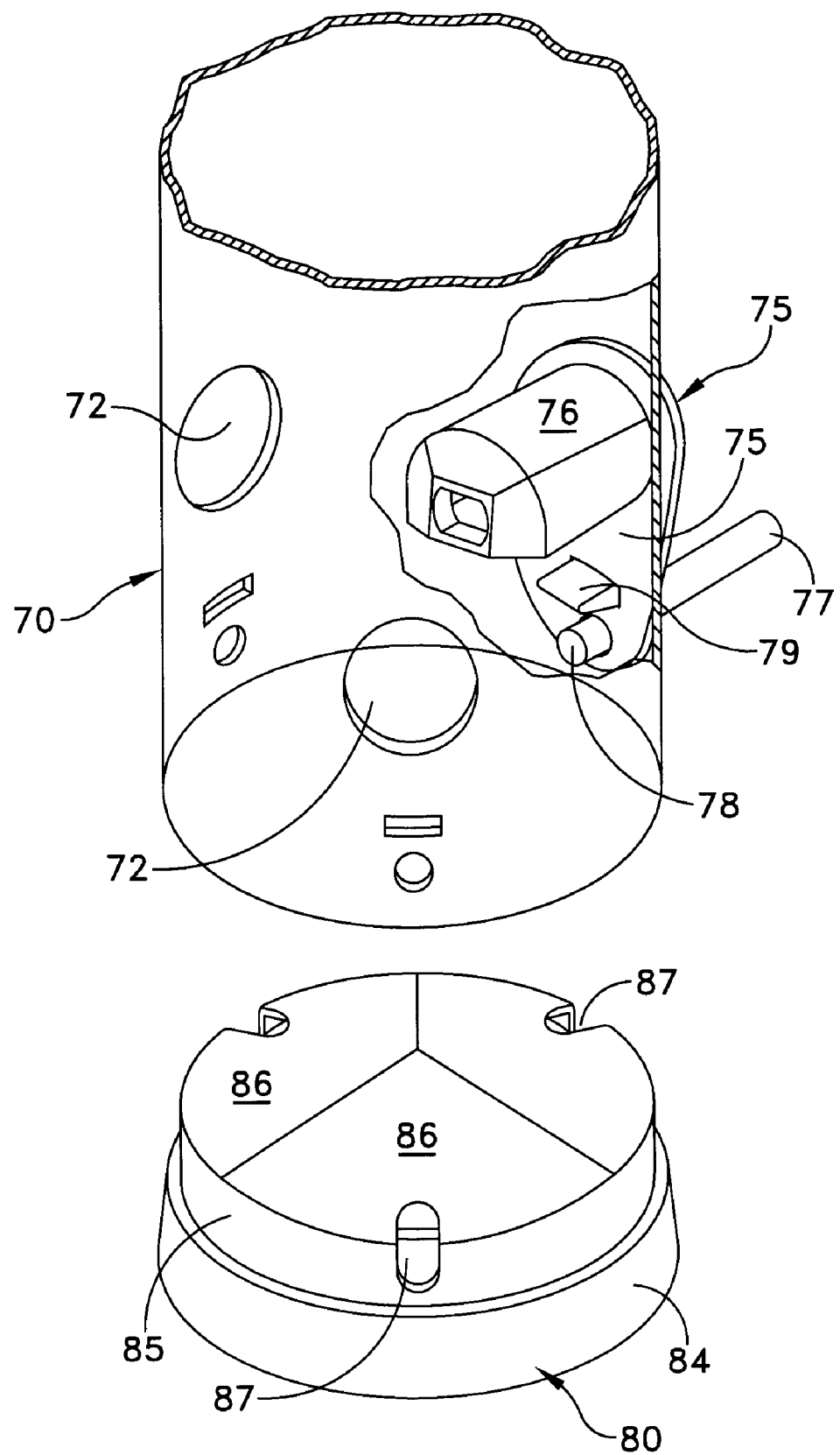
FIG. 23 is an exploded perspective view illustrating a further embodiment of the present invention in which the base assembly is removable by rotation.

Reference is now made to a third embodiment of the present invention illustrated in FIGS. 23-33. In this embodiment of the present invention, the base is removable with the use of a rotatable latch member associated with the base. FIG. 23 illustrates the bottom end of the feed container 70. The top of the container may be the same as depicted previously such as in FIGS. 1 and 19. FIG. 23 also shows the apertures 72 for receiving the port member 74. The port member 74 is substantially the same as the port member previously described, such as illustrated in FIG. 6. The port member 74 includes a collar 75, a hood 76, perch 77, a projection 78 and stop 79. The inside end of the hood 76 may also include a passage for receiving an interconnecting member not specifically illustrated in this embodiment.

The primary difference between the embodiment in FIG. 23-33 and the first embodiment is that there is a different removable base 80. Refer to FIGS. 24-28 for further details of the base assembly 80. The base assembly 80 includes a base member 82 and a latch member 90. These two members may be intercoupled by means of a retaining ring 83.

Figure 25:
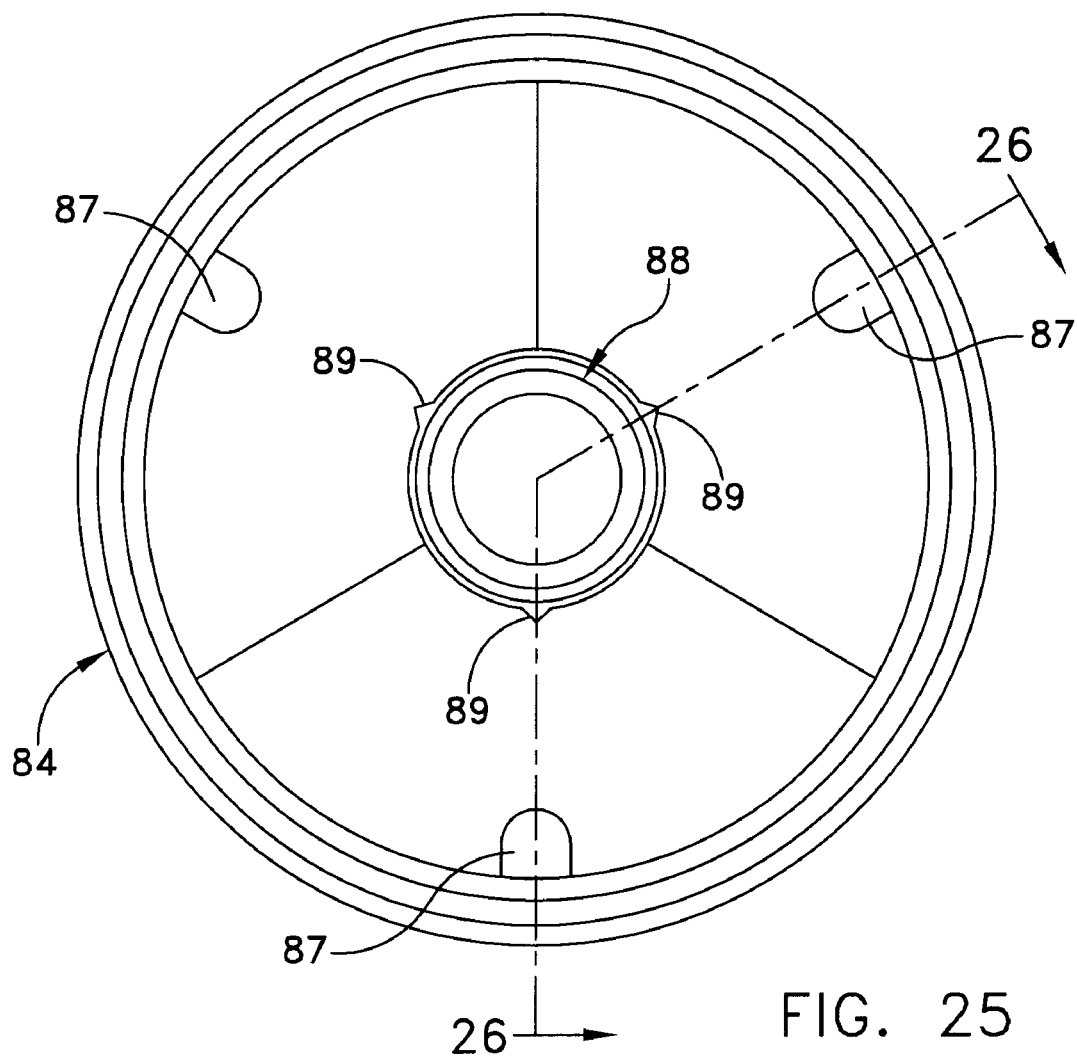
FIG. 25 is a bottom view as observed along line 25-25 of FIG. 24.
Figure 26:
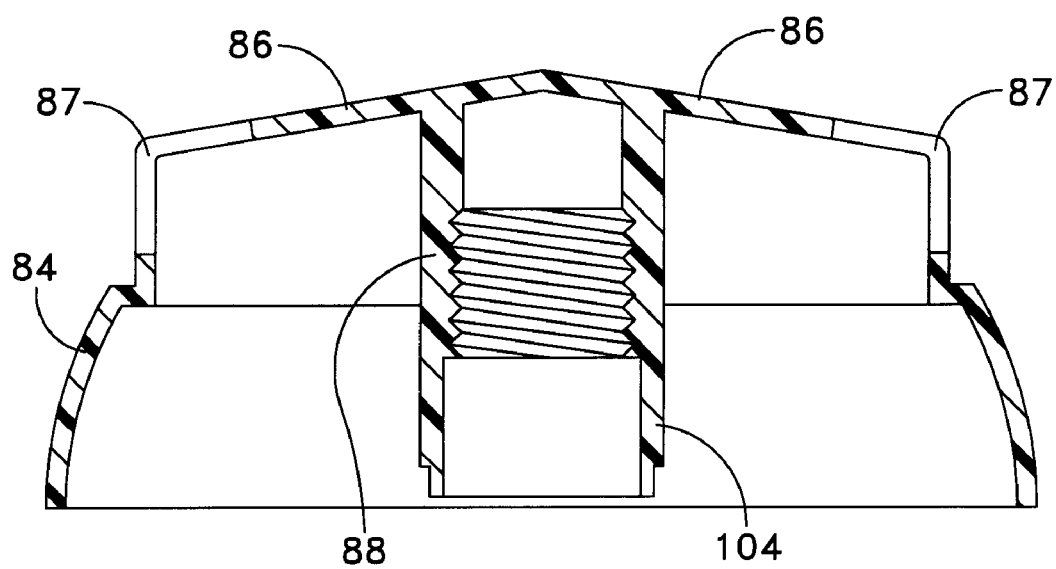
FIG. 26 is a cross-sectional view taken along line 26-26 of FIG. 25.
Figure 27:
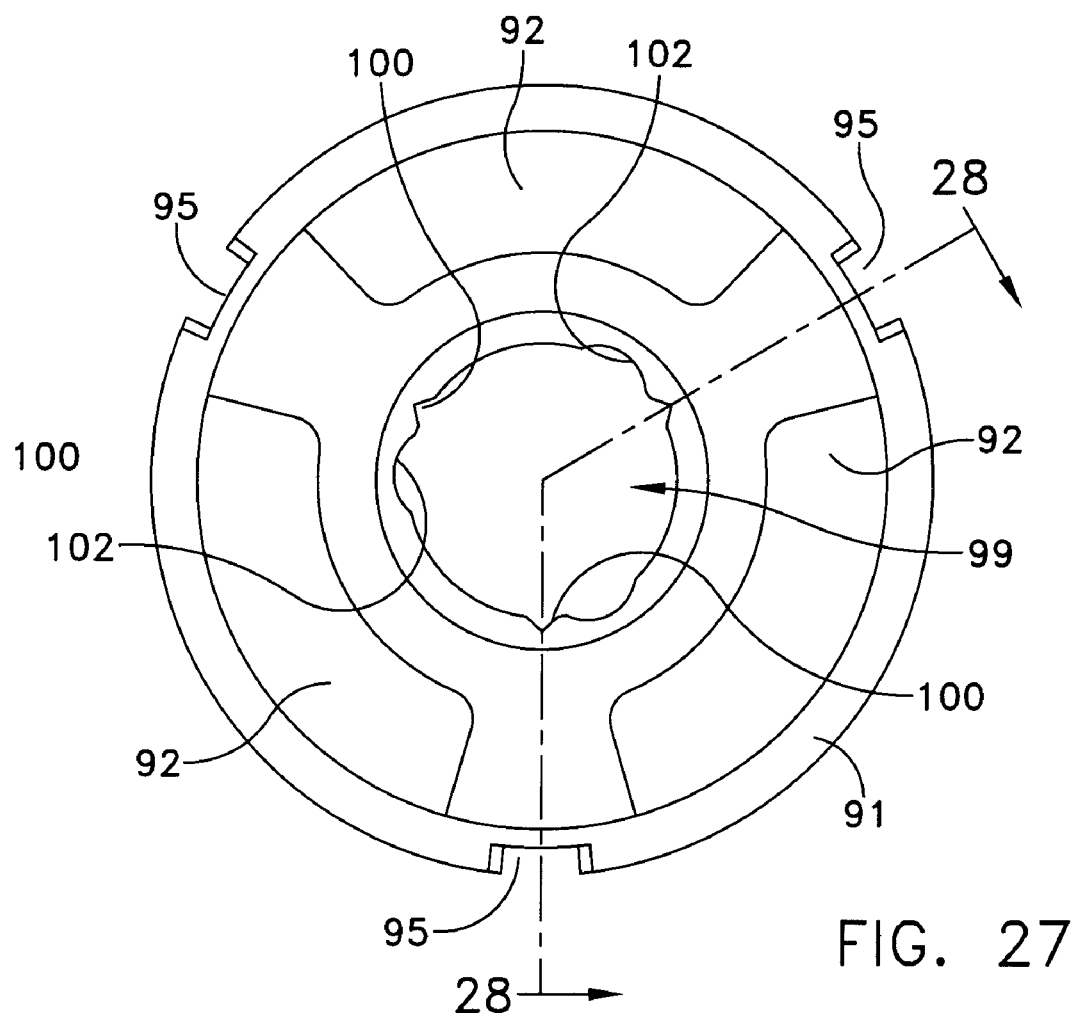
FIG. 27 is a plan view as taken along line 27-27 of FIG. 24.
Figure 28:
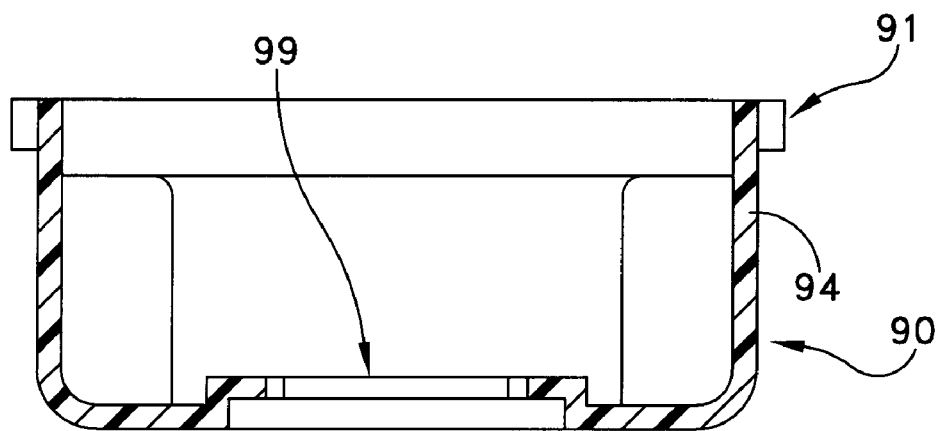
FIG. 28 is a cross-sectional view taken along line 28-28 of FIG. 27.
Figure 29:
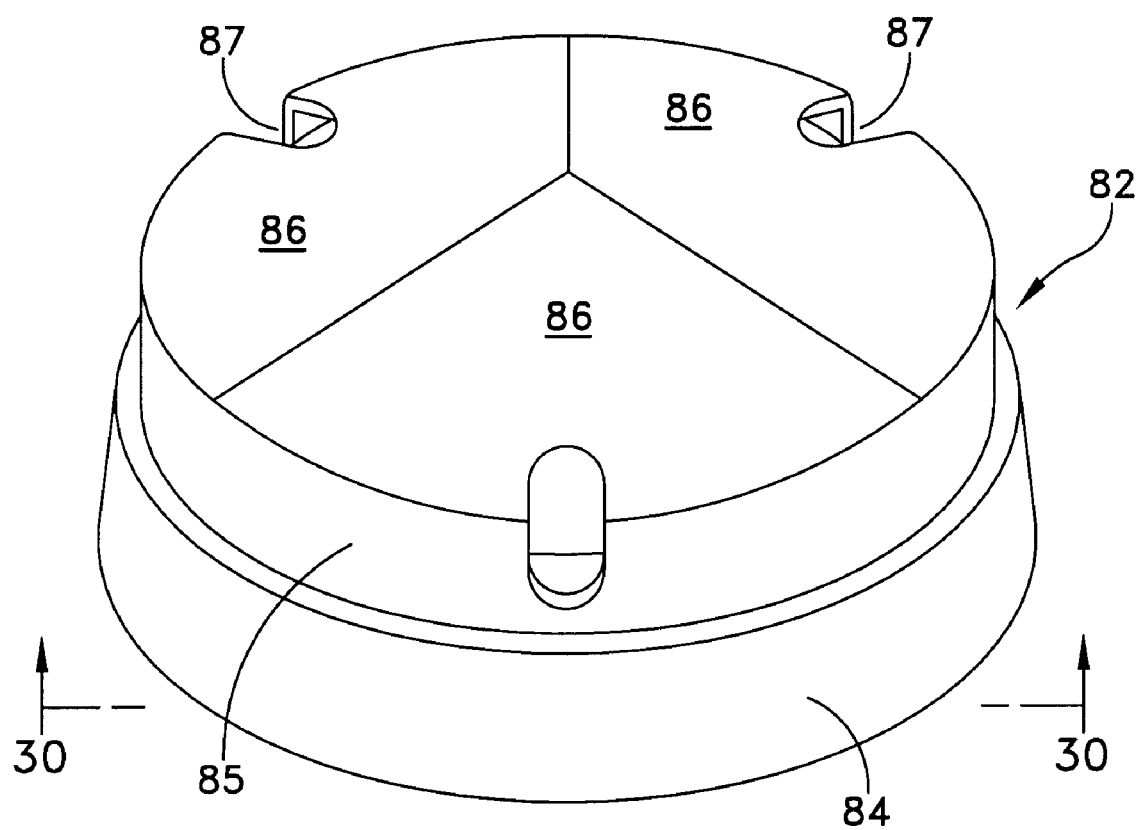
FIG. 29 is a perspective view of the base of FIG. 24.

The base member 82 includes a circumferential ring 84, an upstanding wall 85 and tapered top surfaces 86. Between the circumferential upstanding wall 85 and each of the top surfaces are three slots 87. An internally threaded post 88 (see FIG. 26) extends downwardly from the top surfaces of the base member. As illustrated in FIG. 25, the post 88 also includes three longitudinally disposed ridges 89. These ridges engage with a particular slot structure on the latch member as will be described hereinafter.

The latch member 90 has a rim 91 that extends circumferentially. The latch member 90 is somewhat cup-shaped having internal shoulders 92 that define therebetween finger grips 94. These finger grips are used to rotate the latch member 90 between locked and released positions.

The base member 82 is meant to be engaged with the bottom of the container but is held nonrotatable. The latch member 90, on the other hand, is adapted for limited rotation limited to the base member 82.

In order to interlock the base assembly with the bottom of the container in the embodiment that is disclosed, the interlocking occurs between the base assembly and the projection 78. The projection 78 may be simply an internal extension of the perch 77. The projection 78 is meant to fit within the slot 87 and is adapted for engagement with the latch member. For this purpose, the latch member 90 is provided on its rim 91 with three slots 95 disposed circumferentially in the same manner that the slots 87 are arranged. One side of the slot 95 is defined by a stop 96. There is also a second stop 97 that will limit the amount of rotation of the latch member 90.

Figure 24:
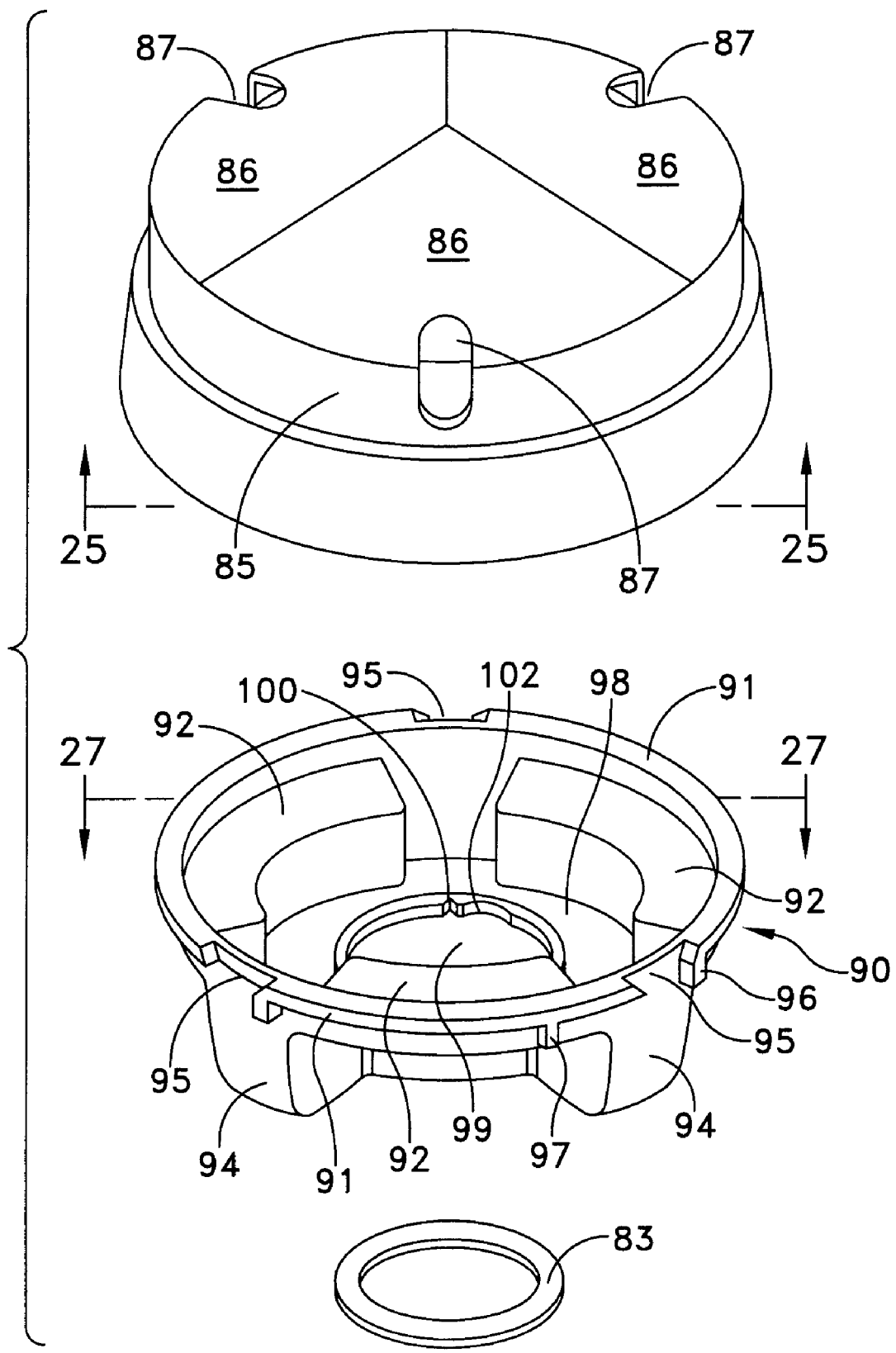
FIG. 24 is an exploded perspective view of the base assembly.

As depicted in FIG. 24, the bottom wall 98 of the latch member 90 has a substantially circular opening 99. A detent arrangement is provided about the opening 99 including a small channel 100 and an arcuate channel 102. The channels 100 and 102 are meant to engage with the post 88 of the base member, particularly with the ridge 104 on the post 88.

Figure 30:
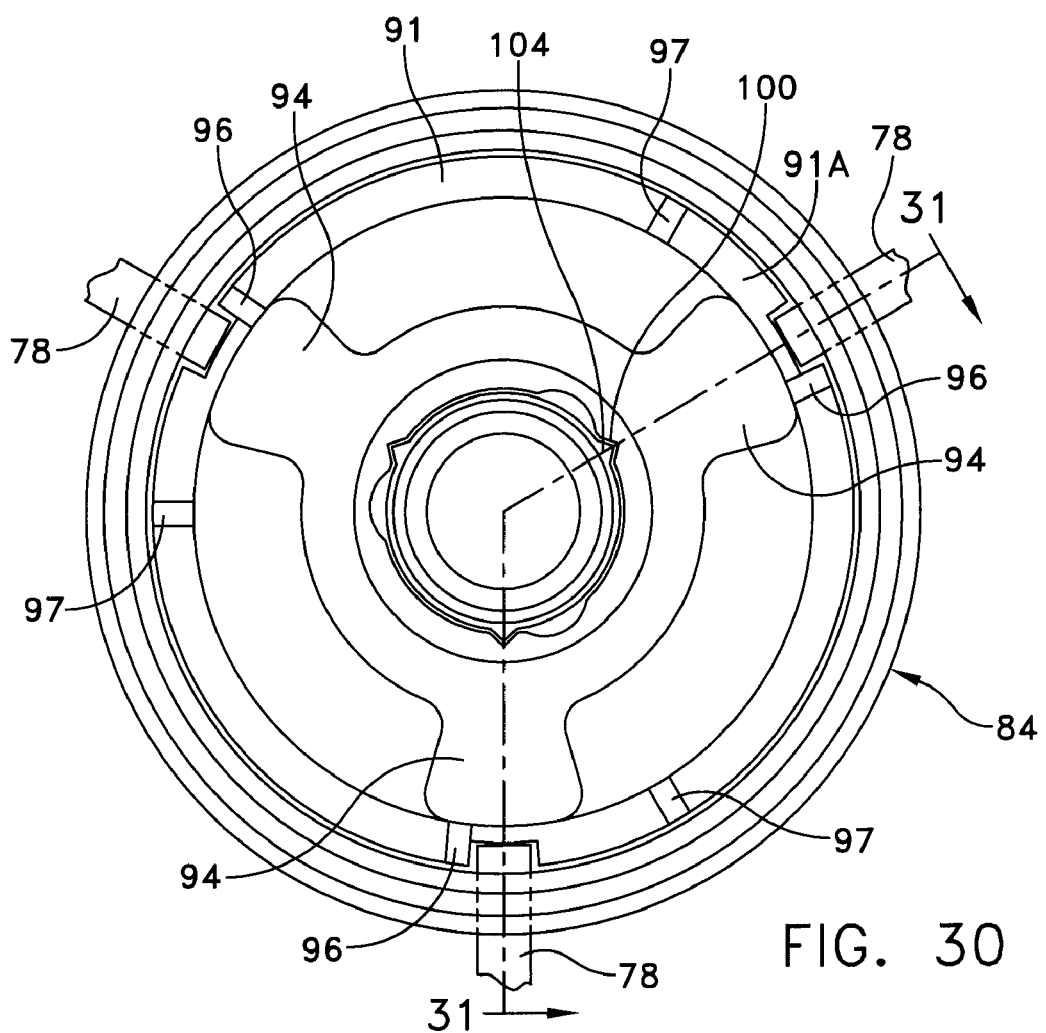
FIG. 30 is a bottom view of the base of FIG. 29 as taken along line 30-30 of FIG. 29.
Figure 31:
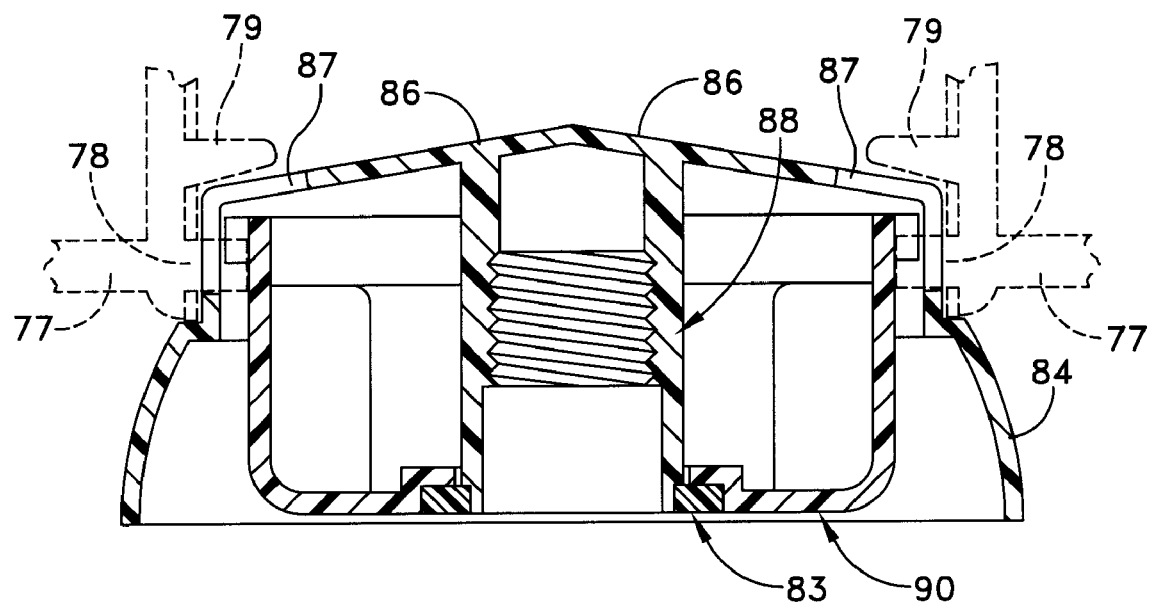
FIG. 31 is a cross-sectional view through the base assembly of FIG. 30 as taken along line 31-31.
Figure 32:
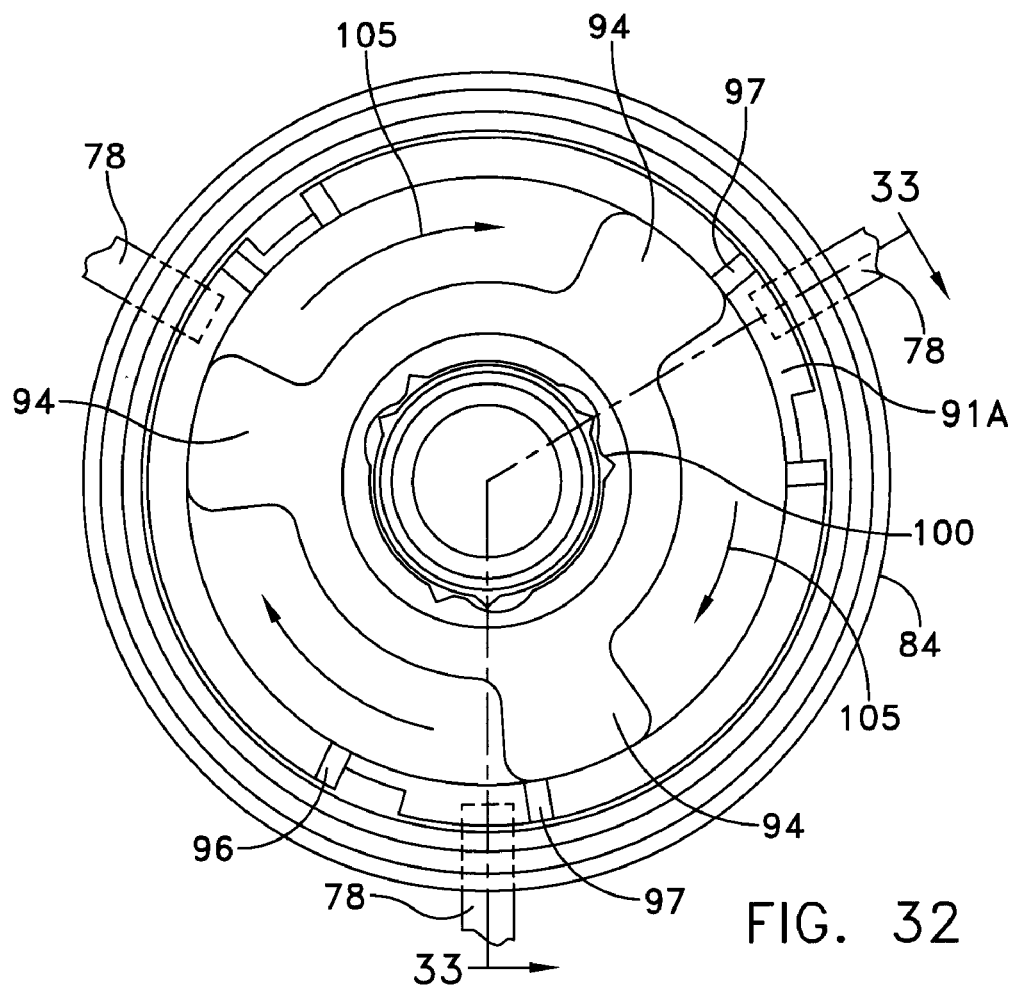
FIG. 32 is a view like that illustrated in FIG. 30 with the base assembly in its lock position.

FIGS. 30 and 31 illustrate the latch member in its open position. In that position it is noted that the projection 78 passes through the slot 87 in the base member 82 and engages the slot 95 (see FIG. 27) of the latch member 90. In that position FIG. 32 illustrates the position of the detents. The channel 100 is engaged with the ridge 104 (see FIG. 30) of the post of the base member 82. In that position the entire base assembly can engage with the base of the container.

Figure 33:
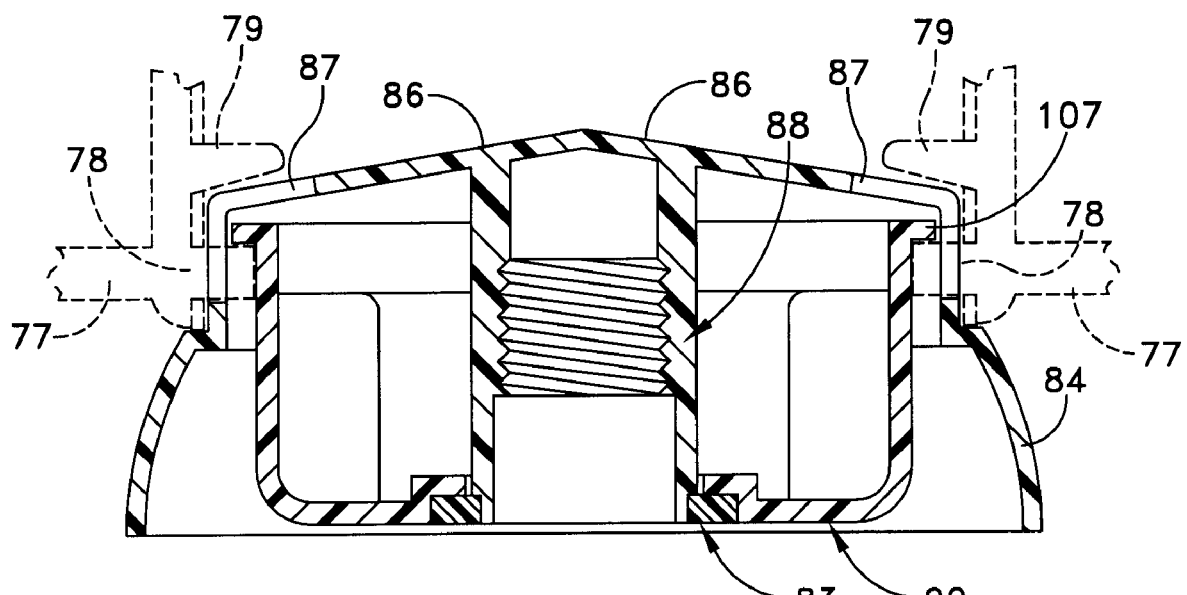
FIG. 33 is a cross-sectional view taken along line 33-33 of FIG. 32.

FIGS. 32 and 33 illustrate the rotation of the latch member by means of the arrows 105. This action causes the lip of the rim 91 to capture the projection 78. This is illustrated at 107 in FIG. 33. The stop 97 limits the extent of rotation of the latch member 90.

Reference is now made to FIGS. 34-40 for an illustration of a support apparatus that may be used with any of the different embodiments illustrated hereinbefore in FIGS. 1-33. In, for example, FIG. 1 the bird feeder is provided with a hanger so that the feeder can be supported from above. In an alternate embodiment of the invention, the bird feeder may be supported from its base by means of an apparatus such as shown in FIGS. 34-40. For that purpose the feeder is preferably provided with a receiving post at its base that is internally threaded as depicted, for example, in FIG. 10.

Existing arrangements for supporting a bird feeder from the ground have not been effective, particularly for the placement of a bird feeder pole into the ground soil. This is particularly the case where the soil is rocky and it has thus been difficult to have an effective means for supporting a bird feeder from the ground. The present invention provides an effective way to secure a support with the ground. In this regard, in accordance with the present invention, there is provided a upright base member that is equipped with extending arms that enable easy insertion of the support into the ground, as well as providing a stable platform for the base member once fully inserted.

The support apparatus comprises a plurality of support arms 110. Each of these support arms is of tubular metallic construction, although each of the arms could also be constructed of a rigid plastic material. The arms 110 could also be of solid construction for insertion into a leg of the main support structure. Each of the arms preferably includes an end cap 112 which may be a plastic piece fitted onto the end of each arm as illustrated, for example, in FIGS. 34 and 35. It is preferred to use an end cap to keep water or other debris from entering the tubular arm 110.

The other main component of the support apparatus of the present invention comprises a main upright member 115. The member 115 may be constructed of metal or a hard plastic material and includes an upright post 118 and a plurality of legs 120. Each of the legs 120 are relatively short in length, as depicted in FIG. 35. Each of the legs 120 has a diameter slightly smaller than the inside diameter of an arm 110 so that the arms can be slid over the legs, such as to the position illustrated in FIG. 34. This fit is preferably a relatively tight fit so that the arms are held in place. A ground engagement element extends downwardly from the base of the upright member 115 and is for engagement into the ground for support of the upright member. This is illustrated in the drawings by the helical screw element 125. FIG. 38 shows the screw element 125 screwed into the ground 127. The helical screw element 125 may be welded to the very bottom of the upright post 118.

The upright post 118 is also hollow, such as illustrated in FIGS. 38 and 39. This is illustrated as supporting a feeder support post 130. The bottom end of the post 130 simply fits inside of the support post 118. A thumb screw 132 is illustrated threaded through the post 118 for tightly securing the bird feeder support post 130 in place. The top end of the bird feeder support post 130 may be threaded, as illustrated in FIG. 38, so as to thread with the base of the bird feeder. Alternatively, the top of the pole 130 may receive an adaptor in which case it need not be threaded. The adaptor may be of the type shown in co-pending application Ser. No. 10/832,051 which is hereby incorporated by reference in its entirety.

In FIGS. 38 and 39 there is illustrated the bird feeder 140 and its associated base 142. The bird feeder 140 and its base 142 may be substantially the same as illustrated in earlier embodiments in FIGS. 1-33. See, for example, FIG. 10 and the threaded member 51. The support post 130 may be made in different lengths depending upon the distance that one wishes to support the bird feeder above the ground level.

Figure 34:
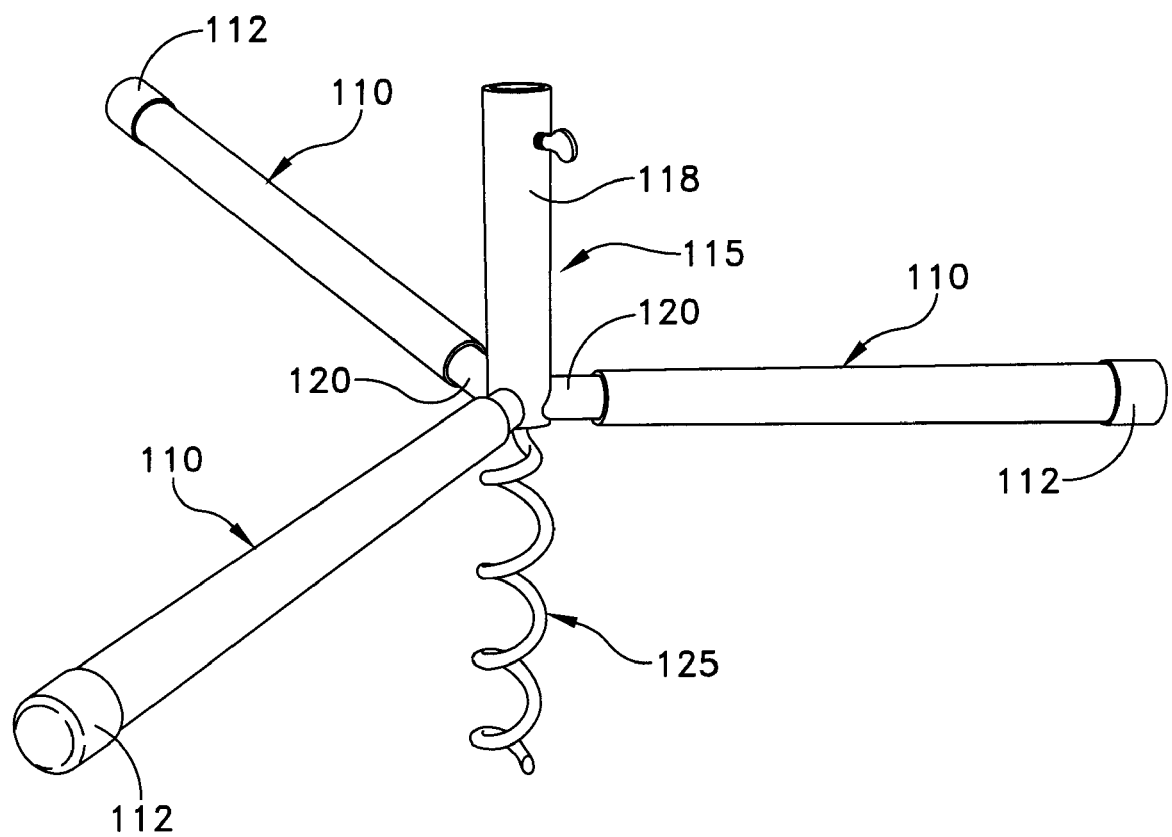
FIG. 34 is a perspective view of a support apparatus for a bird feeder in accordance with the present invention.
Figure 35:
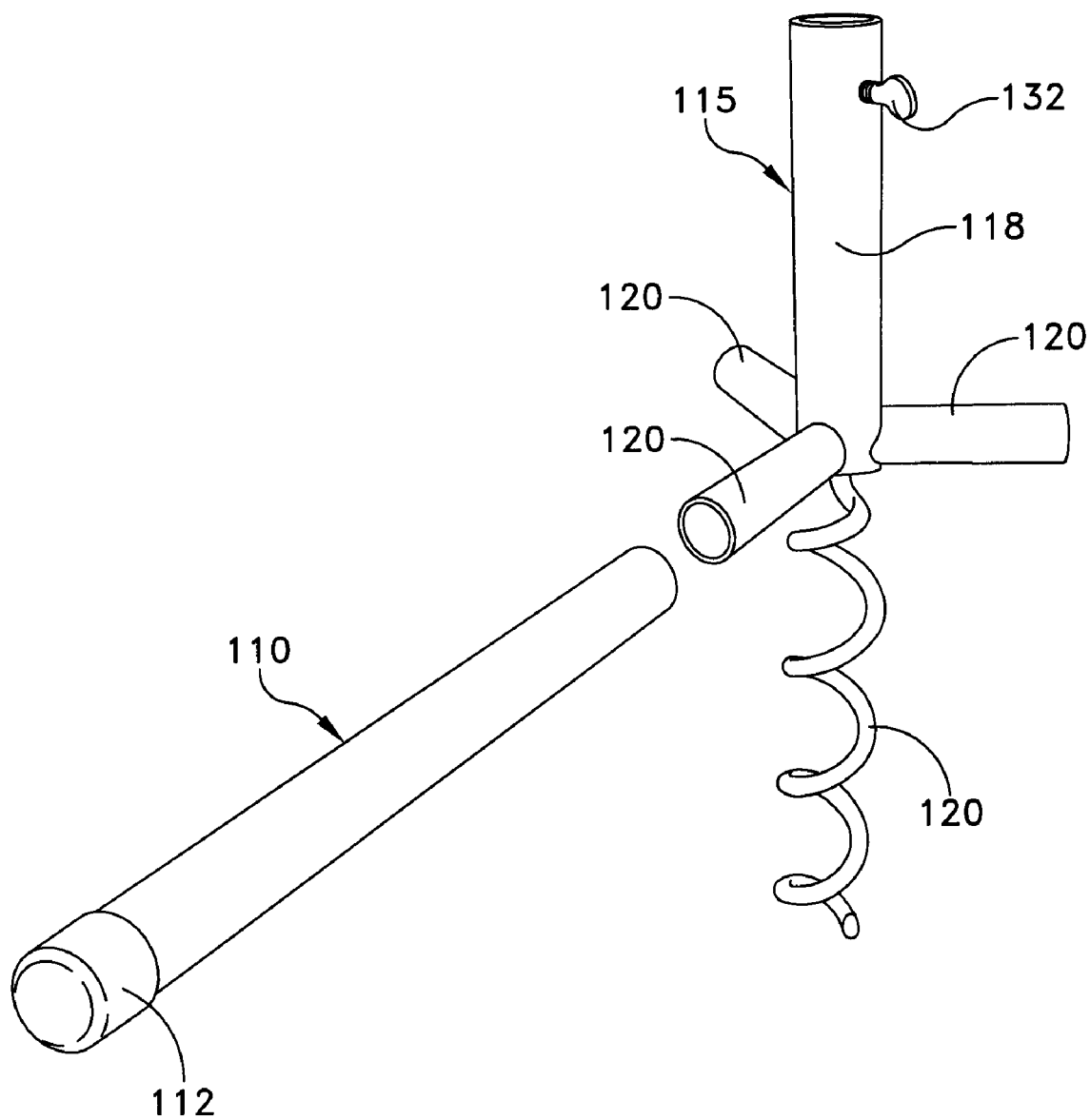
FIG. 35 is a partial perspective view illustrating the manner in which an arm of the support apparatus is engaged with the main support member.
Figures 36, 37:
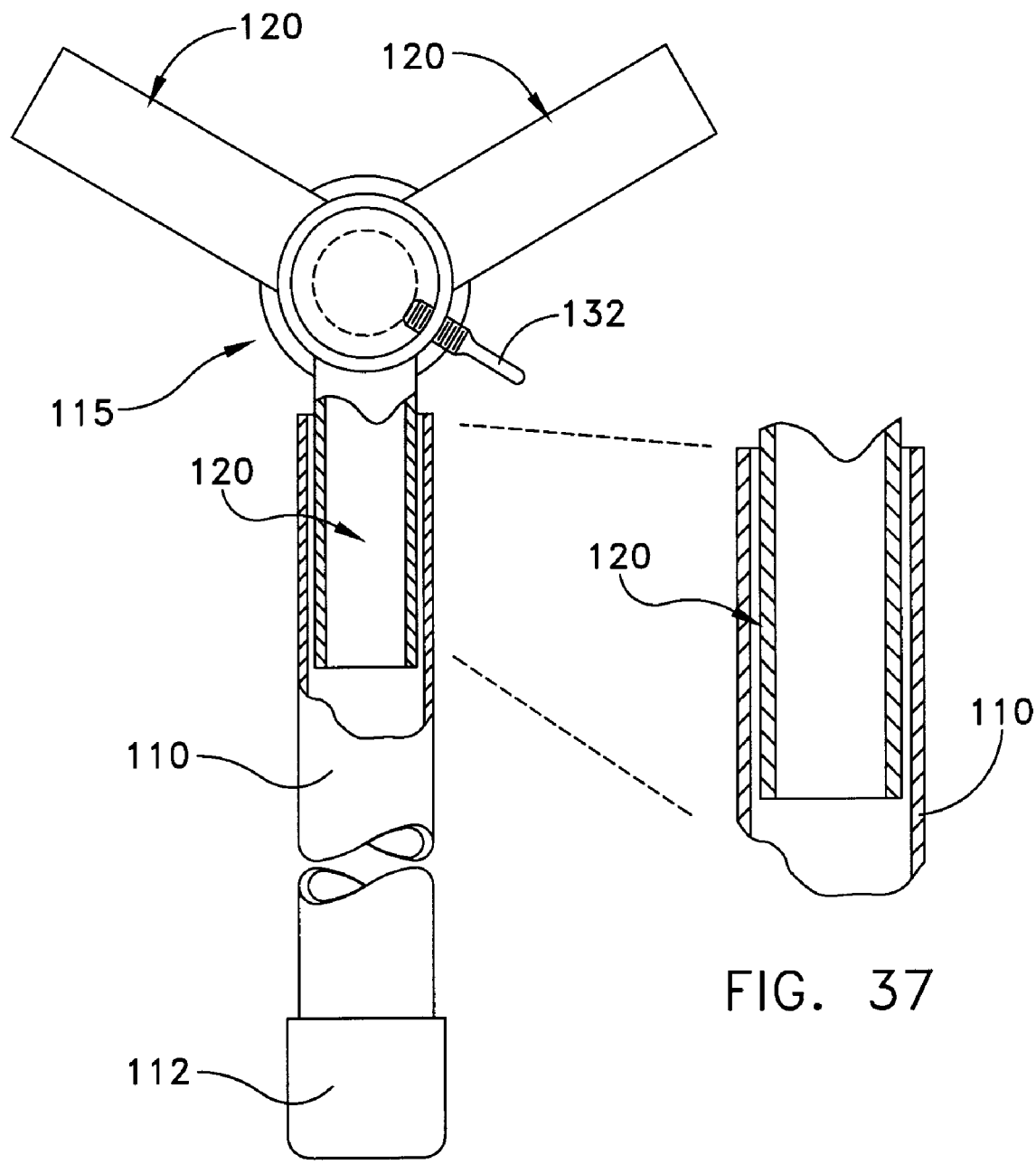
FIG. 36 is a partially cut-away plan view of the support apparatus of FIG. 34.
FIG. 37 is a fragmentary cross-sectional view showing further details.
Figure 40:
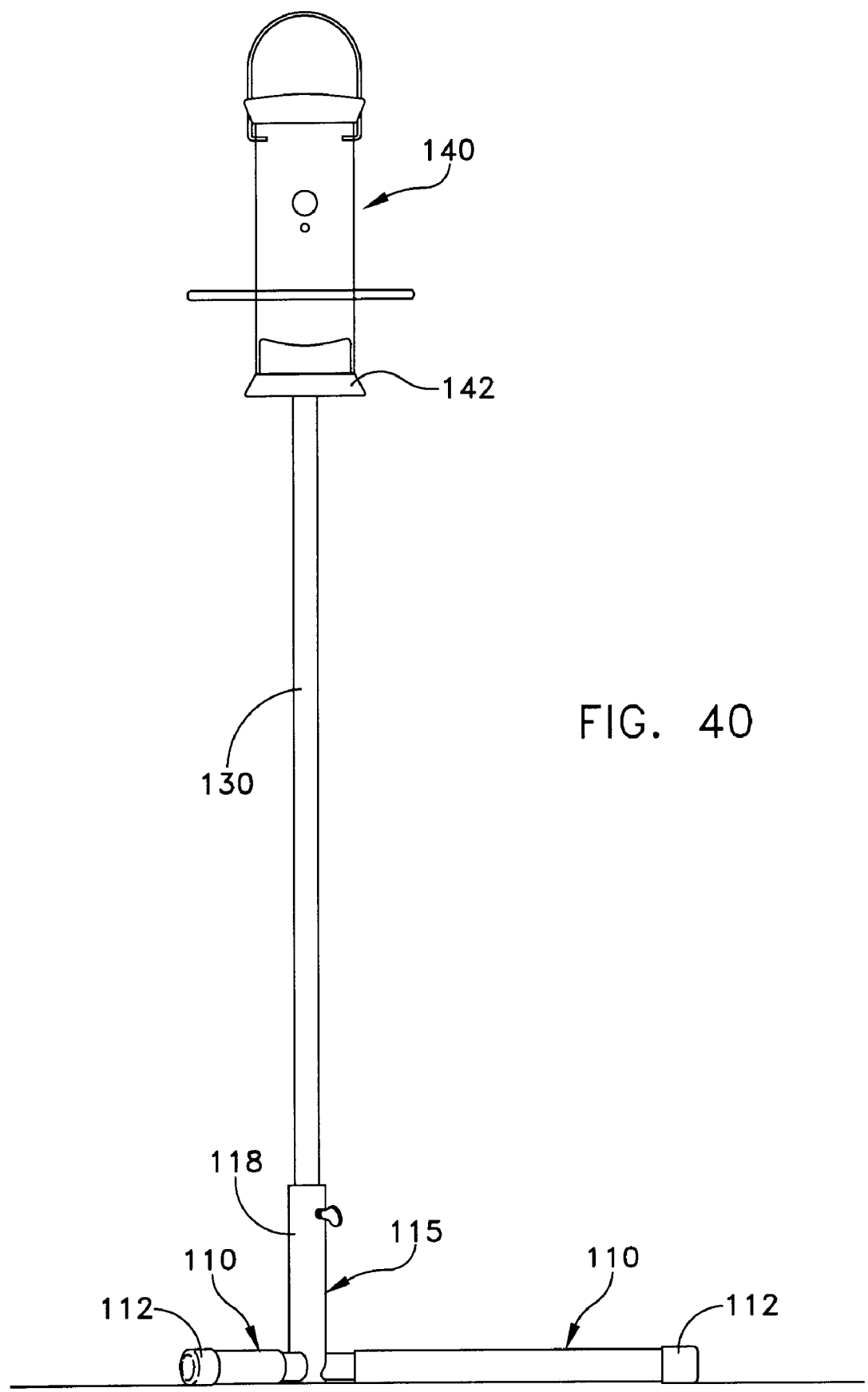
FIG. 40 illustrates the support apparatus of the present invention as used for supporting a bird feeder from the bottom thereof.

The support apparatus illustrated in FIGS. 34-40 is constructed with three support arms. However, in other embodiments of the present invention more or less than three arms may be employed. These arms are preferably symmetrically disposed so that there is a symmetric engagement with the ground surface. Initially the arms 110 are engaged with the legs 120, and once assembled, the device is screwed into the ground by screwing the element 125 into the ground surface. It is preferred that this be done with the arms 110 attached to the legs 120, as this will provide additional leverage in the screwing operation. Also, once fully screwed into the ground, as seen in FIGS. 34 and 38, the arms form a broad support structure for the upright member engaging against the ground surface and locking or bearing tightly against the ground surface.

Also, there has been depicted arrangements in which one member engages into another, such as the arms 110 engaging over the legs 120. In an alternate embodiment, however, the arms 110 can be dimensioned smaller so as to slide inside of the legs 120. Also, the post 130 may be dimensioned to fit over the post 118 in which case the thumb screw would be on the post 130. Other securing means may also be provided between the posts 118 and 130 including providing engaging threaded members.

Having now described a limited number of embodiments of the present invention it should be apparent to those skilled in the art that numerous other embodiments and modifications thereof are contemplated as falling within the scope of the present invention, as defined by the appended claims. For example, in the embodiments disclosed herein, in one embodiment three port members are used, and in another embodiment two port members are used. In another embodiment of the present invention, greater than three port members may be aligned essentially in the same plane. In that instance the interconnecting member would then have four sets of legs. In the embodiment disclosed herein, it is also noted that port members are only provided at the bottom of the seed chamber. In other embodiments of the invention, the port members may be disposed, not only circumferentially as illustrated, but may also be disposed at different heights between the top and bottom of the container. In still another embodiment of the present invention, the port members may be provided only at locations above the base. For those port members disposed above the base the projection and stop are not necessary. In the case where no port member is provided at the base, instead of the port member that is illustrated, a simpler collar member may be provided without any port but including the perch and the inner extension from the perch to provide the projection for engagement with the base assembly. In still another embodiment of the present invention, all of the port members and perches may be disposed above the base, in which case there is provided only a collar member and an inwardly directed projection for engagement with the base assembly. This embodiment may also include the stop as illustrated herein.

What is claimed is:

1. A support apparatus for a bird feeder for supporting the bird feeder above a ground surface, said support apparatus comprising:

an upright member that is comprised of a hollow cylindrical tubular upright support post having an open top with an inner diameter and a bottom base, and constructed and arranged to extend vertically along a longitudinal axis thereof;

a plurality of tubular support legs that are each secured at the base of the hollow cylindrical tubular upright support post, that are each spaced radially from the base of the hollow cylindrical tubular upright support post, and that each have an outer diameter;

all of said tubular support legs fixedly extending from the base of the hollow cylindrical tubular upright support post and arranged in a plane that is orthogonal to the longitudinal axis of the hollow cylindrical tubular upright support post;

a ground engagement element secured to and extending downwardly from the base of said hollow cylindrical tubular upright support post and for engagement with the ground surface for support of said hollow cylindrical tubular upright support post;

said ground engagement element comprising a helical screw element having an axis that coincides with the longitudinal axis of the hollow cylindrical tubular upright support post;

a plurality of elongated hollow tubular support arms;

said plurality of elongated hollow tubular support arms being constructed and arranged so as to extend radially and separately, and each including a distal end;

each of said elongated hollow tubular support arms being respectively and matingly telescopically engaged with a corresponding support leg so as to be arranged in a symmetric radial pattern;

each of said elongated tubular support arms being longer than its mated respective tubular support leg, and having an inner diameter;

said plurality of tubular support legs being equal in number to the number of elongated hollow tubular support arms, and of a smaller outer diameter than the inner diameter of the elongated hollow tubular support arms to provide a relatively tight fit therebetween, so that the respective elongated hollow tubular support arms slide over the tubular support legs so that, when the helical element is fully engaged with the ground surface, only the elongated tubular support arms engage the ground surface and the tubular support legs are spacedly disposed over the ground surface;

a tubular feeder post engaged with the open top of the upright member and for support of the bird feeder;

said feeder post having a smaller outer diameter than the inner diameter of the hollow cylindrical tubular upright support post so that the feeder post can fit within the open top of the hollow cylindrical tubular upright support post;

and a thumb screw for securing the feeder post in a selected vertical position within the upright support post;

the top of the feeder post being externally threaded;

the bottom of the bird feeder having an internally threaded aperture for engagement with the threaded feeder post.

2. The support apparatus of claim 1 including end caps on the distal end of each of the respective elongated hollow tubular support arms.

3. The support apparatus of claim 2 wherein each elongated hollow tubular support arm is freely slidable relative to the associated tubular support leg to different radially extending positions.

4. The support apparatus of claim 3 wherein the length of each support arm is in order of magnitude longer than the length of each support leg.

* * * * *